(12) United States Patent
DiGregoria

(10) Patent No.: US 11,514,187 B1
(45) Date of Patent: Nov. 29, 2022

(54) SYSTEMS AND METHODS FOR MANAGING THE PROCESSING OF CUSTOMER INFORMATION WITHIN A GLOBAL ENTERPRISE

(71) Applicant: Wells Fargo Bank, N.A., San Francisco, CA (US)

(72) Inventor: Gregory Donald DiGregoria, Broomfield, CO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 381 days.

(21) Appl. No.: 16/696,710

(22) Filed: Nov. 26, 2019

(51) Int. Cl.
G06F 21/62 (2013.01)
G06F 21/57 (2013.01)
G06Q 30/00 (2012.01)
H04L 9/40 (2022.01)

(52) U.S. Cl.
CPC ........ *G06F 21/6245* (2013.01); *G06F 21/577* (2013.01); *G06Q 30/0185* (2013.01); *H04L 63/04* (2013.01)

(58) Field of Classification Search
CPC .............. G06F 21/6245; G06F 21/577; G06Q 30/0185; H04L 63/04
See application file for complete search history.

(56) References Cited

U.S. PATENT DOCUMENTS

| | | |
|---|---|---|
| 7,207,067 B2 | 4/2007 | Feng et al. |
| 8,266,050 B2 | 9/2012 | Chheda et al. |
| 8,468,090 B2 | 6/2013 | Lesandro et al. |
| 8,543,410 B2 | 9/2013 | Sinclair et al. |
| 8,543,425 B1 | 9/2013 | Hacker et al. |
| 8,606,723 B2 | 12/2013 | Seubert et al. |
| 8,983,918 B2 | 3/2015 | Alvarez et al. |
| 9,367,884 B2 | 6/2016 | Yeap et al. |
| 10,068,193 B2 | 9/2018 | Miller et al. |
| 2004/0216039 A1 | 10/2004 | Lane et al. |
| 2005/0278246 A1 | 12/2005 | Friedman et al. |

(Continued)

OTHER PUBLICATIONS

Novotny, Transborder Data Flows and International Law: A Framework for Policy-Oriented Inquiry, 16 Stan. J. Int'l L. 141, 1980, 41 pages.

(Continued)

*Primary Examiner* — Robert B Leung
(74) *Attorney, Agent, or Firm* — Foley & Lardner LLP

(57) ABSTRACT

A method for managing customer information pertaining to at least one application associated with a provider. The method includes obtaining initial application information pertaining to the at least one application. The initial application information includes a location of processing of the customer information by the at least one application. The method further includes determining whether additional application information is required based on the location of processing. The method further includes, upon determining that the additional application information is required, obtaining the additional application information based at least in part on the location of processing. The method further includes determining a risk level associated with the at least one application based on the initial application information and the additional application information.

17 Claims, 18 Drawing Sheets

(56) References Cited

U.S. PATENT DOCUMENTS

| | | | | |
|---|---|---|---|---|
| 2006/0272024 | A1* | 11/2006 | Huang | G06F 21/577 |
| | | | | 726/26 |
| 2011/0047620 | A1* | 2/2011 | Mahaffey | G06F 21/564 |
| | | | | 726/22 |
| 2012/0215749 | A1 | 8/2012 | Van Beneden et al. | |
| 2013/0144888 | A1* | 6/2013 | Faith | G06Q 20/40 |
| | | | | 707/755 |
| 2016/0359880 | A1* | 12/2016 | Pang | G06F 16/2322 |
| 2018/0004960 | A1* | 1/2018 | Hoernecke | G06Q 10/0635 |
| 2019/0180051 | A1* | 6/2019 | Barday | G06F 21/6245 |
| 2020/0134227 | A1* | 4/2020 | Joseph | G06F 3/14 |

OTHER PUBLICATIONS

Pearson, Privacy Management in Global Organisations, B. De Decker and D.W. Chadwick (Eds.): CMS 2012, LNCS 7394, pp. 217-237, 2012.

* cited by examiner

SYSTEMS AND METHODS FOR MANAGING THE PROCESSING OF CUSTOMER INFORMATION WITHIN A GLOBAL ENTERPRISE

TECHNICAL FIELD

The present application relates to managing customer information. More particularly, the present application relates to systems and methods for managing customer information to ensure data privacy and integrity throughout a global enterprise.

BACKGROUND

Data privacy is a concern of virtually every global enterprise. In some instances, global enterprises are configured to collect and process data, such as personal and sensitive customer information, within various applications used for a variety of business processes. Global enterprises may operate in a plurality of countries having differing regulations and restrictions with respect to data privacy. In some instances, data, such as personal and sensitive customer information, may be transferred between various countries within various applications, business processes, third and fourth party service providers, and further processing associated with offshoring activities. Managing data privacy risks associated with the collection and processing of personal and sensitive customer information has traditionally been a tedious, time-consuming, and resource-consuming process for global enterprises.

SUMMARY

One example embodiment relates to a method for managing customer information pertaining to at least one application associated with a provider. The method comprises obtaining initial application information pertaining to the at least one application. The initial application information includes a location of processing of the customer information by the at least one application. The method further comprises determining whether additional application information is required based on the location of processing. The method further comprises, upon determining that the additional application information is required, obtaining the additional application information based at least in part on the location of processing. The method further comprises determining a risk level associated with the at least one application based on the initial application information and the additional application information.

Another example embodiment relates to a method for managing customer information pertaining to at least one application associated with a provider. The method comprises obtaining initial application information pertaining to the at least one application. The initial application information includes a location of origin of the customer information within the at least one application and a location of termination of the customer information within the at least one application. The method further comprises determining whether additional application information is required based on the location of origin and the location of termination. The method further comprises, upon determining that the additional application information is required, obtaining the additional application information based at least in part on the location of origin and the location of termination. The method further comprises determining a risk level associated with the at least one application based on the initial application information and the additional application information. The method further comprises generating an application report including a data flow mapping field providing a visual representation of the location of origin, the location of termination, and how customer information is transferred between the location of origin and the location of termination. The method further comprises providing the application report to a user.

Another example embodiment relates to a data management system comprising a network, at least one provider computing system, and a data management computing system. The at least one provider computing system is associated with at least one application configured to process customer information. The at least one provider computing system includes a provider network interface structured to facilitate data communication via the network. The data management computing system comprises a data management network interface, a graphical user interface, and a processing circuit. The data management network interface is structured to facilitate data communication via the network. The processing circuit comprises a processor and a memory. The processing circuit is structured to obtain initial application information pertaining to the at least one application associated with the at least one provider computing system. The initial application information includes a location of origin of the customer information within the at least one application and a location of termination of the customer information within the at least one application. The processing circuit is further structured to determine whether additional application information is required based on the location of origin and the location of termination. The processing circuit is further structured to, upon determining that the additional application information is required, obtain the additional application information based at least in part on the location of origin and the location of termination. The processing circuit is further structured to determine a risk level associated with the at least one application based on the initial application information and the additional application information. The processing circuit is further structured to generate an application report including a data flow mapping field providing a visual representation of the location of origin, the location of termination, and how customer information is transferred between the location of origin and the location of termination. The processing circuit is further structured to provide the application report to a user of the data management computing system via the graphical user interface.

These and other features, together with the organization and manner of operation thereof, will become apparent from the following detailed description when taken in conjunction with the accompanying drawings.

DETAILED DESCRIPTION

Figure 1:
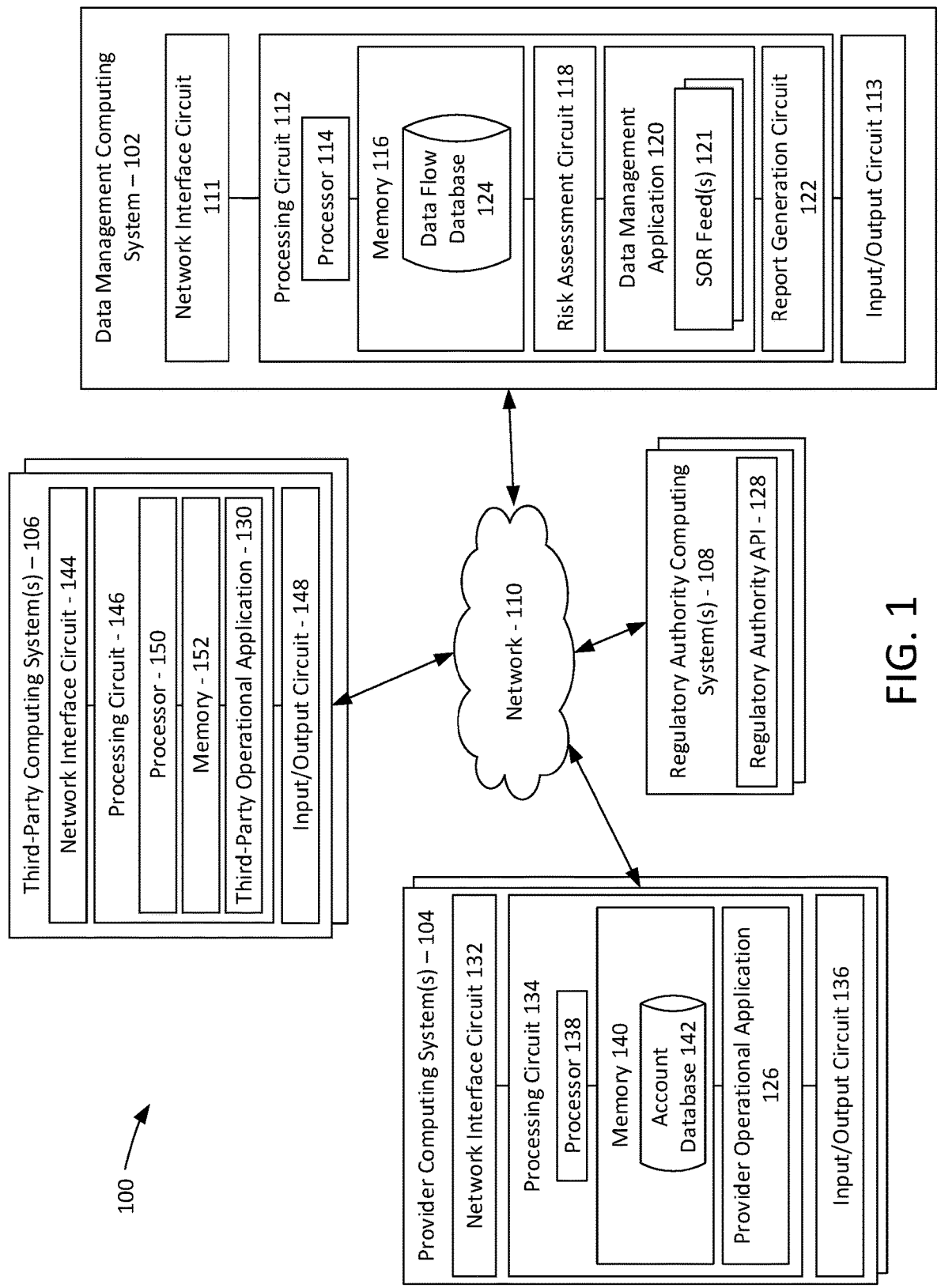
FIG. 1 is a diagram of a data management system, according to an example embodiment.

Referring generally to the figures, systems and methods for managing the use, access, transfer, and processing of customer information by various applications of a global enterprise are shown and described. A data management computing system is configured to compile application information pertaining to the various applications from a plurality of provider computing systems. The application information may pertain to, but is not limited to, locations or countries where the customer information is being processed, how much customer information is being processed (e.g., how many customers' information), how the customer information is being processed, why the customer information is being processed, who is processing or accessing the customer information, and what type of customer information is being processed. The data management computing system may then use the compiled application information to automatically determine a risk level associated with each application's processing of customer information. The data management computing system may then provide various dashboards and reports to a user of the data management computing system indicating, among other things, the risk level associated with each application, as well as a visual representation of how customer information is transferred between various locations (e.g., countries) within each application. By providing the user with the risk level associated with each application and its processing of customer information, along with the visual representation of how the customer information is transferred between various locations (e.g., countries) within each application, the user may quickly identify applications that have a high risk associated with them and how the customer information is being transferred between various locations in those applications.

The embodiments of the data management system and associated data management application described herein improve current computing systems by performing certain steps that cannot be done by conventional computing systems or human actors. For example, the data management system and associated data management application provide a consolidated system and application for managing the processing of customer information across international borders within applications used by a global enterprise. Traditionally, global enterprises operating in multiple countries have had disparate systems and applications. For security reasons, third-party vendors are generally not allowed to access the various systems of a global enterprise to perform any mapping of data flows (e.g., the flow of customer information) and tracking of data usage (e.g., how the customer information is being used) by various applications. Accordingly, identifying applications having a high risk associated with their processing of customer information has been a tedious and time-consuming process. Further, various global data privacy regulatory authorities may require various reports pertaining to the processing of customer information by the global enterprise. The systems and methods described herein allow for a user to quickly identify high risk applications, perform necessary corrective actions to those high risk applications to reduce the risk associated with those applications, and provide necessary reports to global data privacy regulatory authorities upon request to demonstrate compliance with international privacy laws.

Additionally, the systems and methods described herein offer various advantages for users of the data management system. For example, the systems and methods described herein allow for the automatic determination of high risk applications within a global enterprise without needing to individually interview numerous subject matter experts or access multiple systems of records. Further, the automatic determination of the risk level of each application allows for a significant reduction in assessment time needed to identify high risk applications. Accordingly, users of the data management system may more quickly perform necessary corrective action on applications having high risk associated with them, thereby more effectively reducing an overall risk level associated with the global enterprise's processing of customer information.

Referring now to FIG. 1, a block diagram of a data privacy management system 100 for managing the access and processing of customer information (e.g., personal information and sensitive information) within a global enterprise is shown according to an exemplary embodiment. The system 100 includes, among other systems, a data management computing system 102, one or more provider computing systems 104, one or more third-party computing systems 106, and one or more regulatory authority computing systems 108. The data management computing system 102, the provider computing systems 104, the third-party computing systems 106, and the regulatory authority computing systems 108 may communicate through a network 110. The network 110 may be a direct or wired connection (e.g., Ethernet) or a wireless network, which may include one or more of the Internet, cellular network, Wi-Fi, Wi-Max, 802.11X, ZigBee, Bluetooth, a proprietary banking network, a proprietary retail or service provider network, or any other type of wired or wireless network. In this regard, the network 110 generally provides communicable and operative coupling between the data management computing system 102, the provider computing systems 104, the one or more third-party computing systems 106, and/or other components described herein to provide and facilitate the secure or substantially secure exchange of communications (e.g., data, instructions, messages, values, commands).

In some instances, the data management computing system 102 can be associated with a financial provider institution, such as a bank, a clearinghouse, or other financial institutions. In some other instances, the data management computing system 102 may be associated with a data management provider (e.g., a data management and security institution). In some instances, the data management provider may also be a financial provider institution. The data management computing system 102 is shown to include a network interface circuit 111, a processing circuit 112, and an input/output circuit 113.

The network interface circuit 111 is structured to enable the data management computing system 102 to exchange data over network 110. The processing circuit 112 has a processor 114, a memory 116, a risk assessment circuit 118, and a data management application 120. The processor 114 may be implemented as one or more application specific integrated circuits (ASICs), field programmable gate arrays (FPGAs), a group of processing components, or other suitable electronic processing components. As such, the data management computing system 102 is configured to run a variety of application programs and store associated data in a database of the memory 116. One such application may be the data management application 120. The memory 116 may be one or more devices (e.g., RAM, ROM, Flash memory, hard disk storage) for storing data and/or computer code for completing and/or facilitating the various processes described herein. Memory 116 may be or include non-transient volatile memory, non-volatile memory, and non-transitory computer storage media. Memory 116 may include database components, object code components, script components, or any other type of information structure for supporting the various activities and information structures described herein. Memory 116 may be communicably coupled to the processor 114 and include computer code or instructions for executing one or more processes described herein.

In the example embodiment of FIG. 1, the data management computing system 102 further includes a data flow database 124 stored within the memory 116. In some other instances, the data flow database 124 may be stored in a remote server that may be accessible by the network interface circuit 111. In either case, the data flow database 124 is structured to retrievably store data flow information pertaining to how various customer information is used, accessed, transferred, and/or processed by various applications associated with the data management computing system 102 and/or the provider computing systems 104, and/or by various third-party vendors (e.g., third-party computing system(s) 106). In some instances, the data flow information may include information pertaining to the applications themselves, as well as information pertaining to sub-applications, connected systems, and/or data warehouses associated with the applications.

In some instances, the customer information may pertain to various customer accounts associated with a provider of the data management computing system 102 and/or the provider computing systems 104. For example, the customer information may include personal information and/or sensitive information. Personal information may include personal identifiable information (PII) such as name, data of birth, social security number, customer reference numbers, email lists, etc. Sensitive information may include various detailed information pertaining to the customer, such as union membership, political affiliation, employment sector (e.g., public or private), and various other sensitive information types.

The data flow information may include a location of processing, such as a location (e.g., country) of origin of the customer information, a location (e.g., country) of termination of the customer information, and any intermediary locations (e.g., countries) where the customer information is used, accessed, transferred, or processed. The data flow information may further include data usage information pertaining to both the customer information and the programs, applications, and/or third-party vendors that use the customer information. Data usage information may include a data access type for a given application, whether a third party is involved, a data processing type for a given application, whether there are external recipients of the customer information, a purpose of usage of the customer information for a given application, a number of users who have access to the customer information, and a number of customer accounts associated with a given application. Accordingly, the data flow database 124 is structured to retrievably store data flow information pertaining to customer information (e.g., personal information and sensitive information) and the programs, applications, and/or third-party vendors that use or process the customer information.

The risk assessment circuit 118 is structured to receive information from and/or transmit information to the provider computing systems 104, the third-party computing systems 106, and/or the regulatory authority computing systems 108 to determine a risk level rating for each application using, accessing, transferring, and/or processing customer information to aid in the management of data flow between the various components of the system 100. Accordingly, the risk assessment circuit 118 is communicably coupled to each of the provider computing systems 104, the third-party computing system(s) 106, and the regulatory authority computing system(s) 108 through the network 110. In some embodiments, the risk assessment circuit 118 is configured to determine the risk level rating (e.g., low risk, medium risk, high risk) for each application based, at least in part, on the data flow information and privacy guidelines set by regulatory authorities associated with the regulatory authority computing systems 108, as will be further discussed below. In some instances, the privacy guidelines may be retrieved by the risk assessment circuit 118 from the regulatory authority computing systems 108 through use of various regulatory authority APIs 128.

The data management application 120 is structured to provide displays to the data management computing system 102 that enable a user of the data management computing system 102 to view, manage, and/or generate reports pertaining to application data flow information (e.g., how various customer information is used, accessed, transferred, and/or processed) within the system 100 for various applications used by the data management computing system 102, the provider computing systems 104, and/or various third-party vendors (e.g., third-party computing systems 106). Accordingly, the data management application 120 is communicably coupled to the provider computing systems 104 (e.g., the provider operational application 126), the third-party computing system(s) 106 (e.g., various third-party operational applications 130), and the regulatory authority computing system(s) 108 (e.g., using regulatory authority APIs 128).

In some embodiments, the data management application further includes one or more system of record (SOR) feeds 121 that are configured to pull and compile business process information from the various components of the system 100 (e.g., the data management computing system 102, the provider computing systems 104, the third party computing systems 106, and/or the regulatory authority computing systems 108). That is, each of the SOR feeds 121 may be configured to compile various selectively accessible business process information pertaining to various applications and business processes.

For example, the SOR feeds 121 may include, among other things, a vendor management feed, a business process feed, an identity access feed, an SOR risk tolerance feed, and a global data activity feed. The vendor management feed may compile information pertaining to which vendors may receive what kind of data. The vendor management feed may be further configured to store or ensure that proper data transfer practices are in place when an application uses a third-party vendor (e.g., associated with a third-party computing system 106). The business process feed may compile information to the types of information used, accessed, processed, stored, or transferred by various standard business processes used by various applications. The identity access feed may compile information pertaining to which individuals or users have access to what types of data for various applications. The SOR risk tolerance feed may compile various information pertaining to security controls (e.g., provider-specific security identification codes) and risk tolerances or acceptances associated with various applications. The global data activity feed may compile information on the offshoring of data to non-U.S. countries. In some instances, the SOR feeds 121 may automatically pull and compile the various business process information continuously or on a preset schedule (e.g., nightly, weekly, monthly). In some instances, the SOR feeds 121 may pull and compile the various business process information in response to a request entered by a user of the data management computing system 102 via the input/output circuit 113.

The data management application 120 is configured to provide various navigable dashboards to allow a user to selectively view various application data flow information for various applications associated with the system 100. For each application, the application data flow information may include, among other things, the types of customer information used by the application, the number of users associated with the application, the number of users of the application with access to the customer information, and the risk level ranking of the application determined by the risk assessment circuit 118. The data management application 120 is further configured to enable a user to compare the application data flow information of each application to privacy guidelines set by regulatory authorities associated with the regulatory authority computing systems 108, which may be retrieved through use of various regulatory authority APIs 128.

In some embodiments, for applications that are rated as a high risk, the data management application 120 is configured to trigger one or more users (e.g., a data privacy officer and/or an application business owner associated with the provider computing system 104) to perform a data protection impact assessment and/or a legitimate interest assessment. In some instances, these assessments may be standard assessments requested by a regulatory authority associated with the regulatory authority computing system 108. The data protection impact assessment and/or the legitimate interest assessment may be documents maintained and/or filled out by one or more users and loaded into the data management application 120 as part of the record of processing for the application associated with the system 100. The data protection impact assessment and the legitimate interest assessment will be further described below.

The data management application 120 may then allow for a user to effectively minimize the risk associated with a given application by ensuring that best practices are employed when using the given application to eliminate or reduce the possibility of customer information being inappropriately used or accessed. Further, the data management application 120 may be used to perform self-assurance and independent risk assessments as part of various lines of defense to identify, mitigate, and monitor risk throughout the lifecycle of a given application. In some embodiments, the user may contact an employee of a provider associated with the provider computing system 104 or multiple employees of multiple providers associated with multiple provider computing systems 104 to implement the best practices while using the application. In some other embodiments, the data management application 120 may be configured to automatically instruct the provider computing system 104 to implement updated best practices. For example, the best practices may include changes in user access to customer information for a given application, updated customer information access training, ensuring a quality control practice is in place to minimize errors, establishing procedures to determine when and how often personal information should be reviewed and/or updated, establishing procedures to determine when data should be deleted or archived, etc. In some instances, the data management application 120 may be configured to instruct the provider computing system 104 (e.g., provider operational application 126) to pseudonymize all of the customer information to further protect the customer information.

In some embodiments, for applications that are rated as medium or low risk, the data management application 120 may be configured to store any associated application information in the data flow database 124 of the memory 116. In some instances, a review of medium and/or low risk applications may be performed to similarly ensure that best practices are in place to further reduce risk associated with the medium and/or low risk applications. In some instances, the risk levels for each application within a particular line of business, a country or region, and/or the enterprise globally may further be aggregated and used to measure overall risk to the corresponding line of business, country or region, and/or the enterprise globally.

The data management application 120 may further be configured to enable a user to selectively generate various reports pertaining to the record of processing of customer information for various applications. The reports may be generated using the report generation circuit 122, as described herein. The data management application 120 may then be configured to send or transmit these reports to regulatory authorities associated with the regulatory authority computing systems 108 upon request by the regulatory authorities to demonstrate compliance with appropriate privacy laws based, in part, on the application data flow information, as will be discussed herein.

In some embodiments, the data management application 120 may be incorporated with an existing application in use by the provider (e.g., a bank management application). In other embodiments, the data management application 120 is a separate software application implemented on the data management computing system 102. The data management application 120 may be downloaded by the data management computing system 102 prior to its usage, hard coded into the memory 116 of the data management computing system 102, or be a web-based interface application such that the data management computing system 102 may provide a web browser to the application, which may be executed remotely from the data management computing system 102.

In the latter instances, a user of the data management computing system 102 may have to log onto or access the web-based interface before usage of the data management application 120. Specifically, due to the sensitive nature of various information processed and/or handled by the data management application 120, varying access may be provided to the user based on their role within the enterprise. Further, and in this regard, the data management application 120 may be supported by a separate computing system including one or more servers, processors, network interface circuits, etc. that transmit applications for use to the data management computing system 102. In certain embodiments, the data management application 120 includes an application programming interface (API) and/or a software development kit (SDK) that facilitate the integration of other applications within the data management application 120. For example, the data management application 120 may include an API that facilitates the receipt and/or transmittal of information pertaining to the system 100 as described further below.

In some embodiments, the data management application 120 is configured to utilize the functionality of the provider computing systems 104 by interacting with the provider operational application 126 of the provider computing systems 104. Accordingly, the data management application 120 may be communicably coupled with the provider computing systems 104 and the third-party computing system 106 to perform a variety of functions. The data management application 120 may be a network-based or web application. Accordingly, the data management computing system 102 includes software and/or hardware capable of implementing a network-based or web application. The data management application 120 includes software such as HTML, XML, WML, SGML, PHP (Hypertext Preprocessor), CGI, and like languages.

The report generation circuit 122 is structured to receive information from and/or transmit information to the provider computing systems 104, the third-party computing systems 106, and/or the regulatory authority computing systems 108 to generate various reports pertaining to application data flow information to further aid in the management of data flow between the various components of the system 100. Accordingly, the report generation circuit 122 is communicably coupled to each of the provider computing system 104. For example, the report generation circuit 122 may be configured to generate a cross border application registry details report, a record of processing report, a certification completion report, a legitimate interest assessment report, and a data privacy impact assessment report.

Although FIG. 1 shows the risk assessment circuit 118 and the report generation circuit 122 as part of the processing circuit 112, in other arrangements the risk assessment circuit 118 and the report generation circuit 122 are embodied as separate processing circuits. Other arrangements may include more or less circuits without departing from the spirit and scope of the present disclosure. Therefore, those of ordinary skill in the art will appreciate that the present arrangement is not meant to be limiting.

The input/output circuit 113 is structured to receive communications from and provide communications to the user associated with the data management computing system 102. In this regard, the input/output circuit 113 is structured to exchange data, communications, instructions, etc. with an input/output component of the data management computing system 102. Accordingly, in one embodiment, the input/output circuit 113 includes an input/output device. In another embodiment, the input/output circuit 113 includes communication circuitry for facilitating the exchange of data, values, messages, and the like between an input/output device and the components of the data management computing system 102. In yet another embodiment, the input/output circuit 113 includes machine-readable media for facilitating the exchange of information between an input/output device and the components of the data management computing system 102. In still another embodiment, the input/output circuit 113 includes any combination of hardware components, communication circuitry, and machine-readable media.

For example, in some embodiments, the input/output circuit 113 comprises suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or manipulation purposes. That is, the input/output circuit 113 provides an interface for the user to interact with various applications (e.g., the data management application 120) stored on the data management computing system 102. In some instances, the input/output circuit 113 may be configured to display the various navigable dashboards and reports to the user through the local display. In some instances, the input/output circuit 113 may further comprise and/or be communicably coupled to a printing device. Accordingly, in some instances, the authentication passcode may be printed out and provided physically to the customer.

Referring still to FIG. 1, the provider computing system 104 will now be described. It will be understood that the following description of the provider computing system 104 may be applied to any additional provider computing systems of the system 100. In some instances, the provider computing system 104 may be associated with a provider institution, such as a bank, a clearinghouse, or other financial institutions. In some instances, the provider computing system 104 may be associated with the same provider institution or data management provider as the data management computing system 102. Accordingly, in some instances, the provider computing system 104 (or multiple provider computing systems 104) and the data management computing system 102 may be owned and/or operated by the same entity. The provider computing system 104 includes a network interface circuit 132, a processing circuit 134, and an input/output circuit 136. The network interface circuit 132 is similarly structured to enable the provider computing system 104 to exchange data over the network 110.

The processing circuit 134 is structured to store and allow for a user of the provider computing system 104 to view and manage various applications of the provider computing system 104 (e.g., the provider operational application 126). For example, the processing circuit 134 includes a processor 138, a memory 140, and the provider operational application 126. The processor 138 and the memory 140 are substantially similar to the processor 114 and the memory 116 described above. As such, the provider computing system 104 (e.g., the processing circuit 134) is configured to run a variety of application programs and store associated data in a database of the memory 140. One such application may be the provider operational application 126.

In the example embodiment of FIG. 1, the provider computing system 104 further includes an account database 142. The account database 142 may store customer information pertaining to various accounts associated with the provider of the provider computing system 104. The account database 142 may store any of the customer information described above, with respect to the data flow database 124. For example, the customer information may include personal information and/or sensitive information. The personal information may include personal identifiable information (PII) such as name, data of birth, social security number, customer reference numbers, email lists, etc. Sensitive information may include various detailed information pertaining to the customer, such as union membership, political affiliation, employment sector (e.g., public or private), and various other sensitive information types.

In some instances, the account database 142 may be stored within the memory 140. In some other instances, the account database 142 may be stored in a remote server that may be accessible by the network interface circuit 132. These circuits and/or data storage entities may be combined as needed such that one or more data storage entities and/or circuit(s) are implemented in a hybrid form. An example of a hybrid implementation is a data storage entity having a shell and/or providing an API such that a library of code (for example, executable functions containing Data Manipulation Language (DML) instructions) may be used by entities within or outside the system 100.

The provider operational application 126 is structured to provide displays to the provider computing system 104 that enable a user of the provider computing system 104 to manage usage of various applications used by the provider computing system 104. The provider operational application 126 is further structured to provide displays to the provider computing system 104 that enable a user of the provider computing system 104 to receive, view, manage, and/or generate reports pertaining to the various applications. For example, the provider operational application 126 may be configured to receive various reports pertaining to various applications used by the provider computing system 104 that use, access, transfer, and/or process customer information. The provider operational application 126 may then be configured to allow a user of the provider computing system 104 to implement changes in the handling of the customer information based on information and suggestions contained within the various received reports. In some instances, the provider operational application 126 may be further configured to allow a user of the provider computing system 104 (e.g., a business owner) to provide various information regarding the handling of customer information by applications associated with the provider computing system 104 to the data management computing system 102 (e.g., the data management application 120, as will be described below.

In some embodiments, the provider operational application 126 may be incorporated with an existing application in use by the provider computing system 104 (e.g., a mobile banking application, a service provider application, etc.). In other embodiments, the provider operational application 126 is a separate software application implemented on the provider computing system 104. The provider operational application 126 may be downloaded by the provider computing system 104 prior to its usage, hard coded into the memory 140 of the provider computing system 104, or be a web-based interface application such that the provider computing system 104 may provide a web browser to access the application, which may be executed remotely from the provider computing system 104.

In the latter instance, the user (e.g., a provider manager) may have to log onto or access the web-based interface before usage of the application. Further, and in this regard, the provider operational application 126 may be supported by a separate computing system including one or more servers, processors, network interface circuits, etc. that transmit applications for use to the provider computing system 104. In certain embodiments, the provider operational application 126 includes an application programming interface (API) and/or a software development kit (SDK) that facilitate the integration of other applications with the provider operational application 126.

In some embodiments, the provider operational application 126 is configured to utilize the functionality of the data management computing system 102 by interacting with the data management application 120. Accordingly, the provider operational application 126 may be communicably coupled with the data management computing system 102 and the third-party computing system 106 to perform a variety of functions. For example, in some instances, the provider operational application 126 is configured to communicate with the third-party computing system 106 (e.g., the third-party operational application 130) to obtain information pertaining to the flow, use, and/or processing of customer information by the third party vendor associated with the third-party computing system 106, as will be described below. In some embodiments, the provider operational application 126 may be a network-based or web application. Accordingly, the provider computing system 104 includes software and/or hardware capable of implementing a network-based or web application. The provider operational application 126 includes software such as HTML, XML, WML, SGML, PHP (Hypertext Preprocessor), CGI, and like languages.

The input/output circuit 136 is structured to receive communications from and provide communications to the user of the provider computing system 104. In this regard, the input/output circuit 136 is structured to exchange data, communications, instructions, etc. with an input/output component of the provider computing system 104. Accordingly, in one embodiment, the input/output circuit 136 includes an input/output device. In another embodiment, the input/output circuit 136 includes communication circuitry for facilitating the exchange of data, values, messages, and the like between an input/output device and the components of the provider computing system 104. In yet another embodiment, the input/output circuit 136 includes machine-readable media for facilitating the exchange of information between an input/output device and the components of the provider computing system 104. In still another embodiment, the input/output circuit 136 includes any combination of hardware components, communication circuitry, and machine-readable media.

For example, in some embodiments, the input/output circuit 136 comprises suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or manipulation purposes. That is, the input/output circuit 136 provides an interface for the user to interact with various applications (e.g., the provider operational application 126) stored on the provider computing system 104.

Referring still to FIG. 1, the third-party computing system 106 will now be described. It will similarly be understood that the following description of the third-party computing system 106 may be applied to any additional third-party computing systems of the system 100. In some instances, the third-party computing system 106 may be associated with a third party vendor that is separate from the provider institution and/or the data management and security institution associated with the data management computing system 102 and/or the provider computing system 104. The third-party computing system 106 includes a network interface circuit 144, a processing circuit 146, and an input/output circuit 148. The network interface circuit 144 is similarly structured to enable third-party computing system 106 to exchange data over the network 110.

The processing circuit 146 is structure to store and allow for a user of the third-party computing system 106 to view and manage various applications of the third-party computing system 106 (e.g., the third-party operational application 130). For example, the processing circuit 146 includes a processor 150, a memory 152, and the third-party operational application 130. The processor 150 and the memory 152 may be substantially similar to the processor 114 (and processor 138) and the memory 116 (and memory 140) described above. As such, the third-party computing system 106 (e.g., the processing circuit 146) is configured to run a variety of application programs and store associated data in a database of the memory 152. One such application may be the third-party operational application 130.

The third-party operational application 130 is structured to provide displays to the third-party computing system 106 that enable a user of the third-party computing system 106 to manage usage of various applications used by the third-party computing system 106. The third-party operational application 130 is also configured to allow a user of the third-party operational application 130 (e.g., a third-party vendor) to provide various information regarding the handling of customer information by applications associated with the third-party computing system 106 to an associated provider computing system 104 (e.g., the provider operational application 126) or the data management computing system 102 (e.g., the data management application 120).

In some embodiments, the third-party operational application 130 may be incorporated with an existing application in use by the third-party computing system 106 (e.g., a mobile banking application, a service provider application, etc.). In other embodiments, the third-party operational application 130 is a separate software application implemented on the third-party computing system 106. The third-party operational application 130 may be downloaded by the third-party computing system 106 prior to its usage, hard coded into the memory 152 of the third-party computing system 106, or be a web-based interface application such that the third-party computing system 106 may provide a web browser to access the application, which may be executed remotely from the third-party computing system 106.

In the latter instance, the user (e.g., a third-party vendor) may have to log onto or access the web-based interface before usage of the application. Further, and in this regard, the third-party operational application 130 may be supported by a separate computing system (e.g., the data management computing system 102) including one or more servers, processors, network interface circuits, etc. that transmit applications for use to the third-party computing system 106. In certain embodiments, the provider operational application 126 includes an application programming interface (API) and/or a software development kit (SDK) that facilitate the integration of other applications with the third-party operational application 130. In some embodiments, the third-party operational application 130 may be a network-based or web application. Accordingly, the third-party computing system 106 includes software and/or hardware capable of implementing a network-based or web application. The third-party operational application 130 includes software such as HTML, XML, WML, SGML, PHP (Hypertext Preprocessor), CGI, and like languages.

The input/output circuit 148 is structured to receive communications from and provide communications to the user of the third-party computing system 106. In this regard, the input/output circuit 148 is structured to exchange data, communications, instructions, etc. with an input/output component of the third-party computing system 106. Accordingly, in one embodiment, the input/output circuit 148 includes an input/output device. In another embodiment, the input/output circuit 148 includes communication circuitry for facilitating the exchange of data, values, messages, and the like between an input/output device and the components of the third-party computing system 106. In yet another embodiment, the input/output circuit 148 includes machine-readable media for facilitating the exchange of information between an input/output device and the components of the third-party computing system 106. In still another embodiment, the input/output circuit 148 includes any combination of hardware components, communication circuitry, and machine-readable media.

For example, in some embodiments, the input/output circuit 148 comprises suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or manipulation purposes. That is, the input/output circuit 148 provides an interface for the user to interact with various applications (e.g., the third-party operational application 130) stored on the third-party computing system 106.

Referring still to FIG. 1, the regulatory authority computing system 108 will now be described. It will similarly be understood that the following description of the regulatory authority computing system 108 may be applied to any additional regulatory authority computing systems of the system 100. In some instances, the regulatory authority computing system 108 may be associated with a regulatory authority that governs global privacy policy. The various components of the system 100 (e.g., the data management computing system 102, the provider computing systems 104, the third-party computing systems 106) are therefore configured to receive various privacy regulations pertaining to various countries from the regulatory authority computing systems 108, as necessary for a given application.

Figure 2:
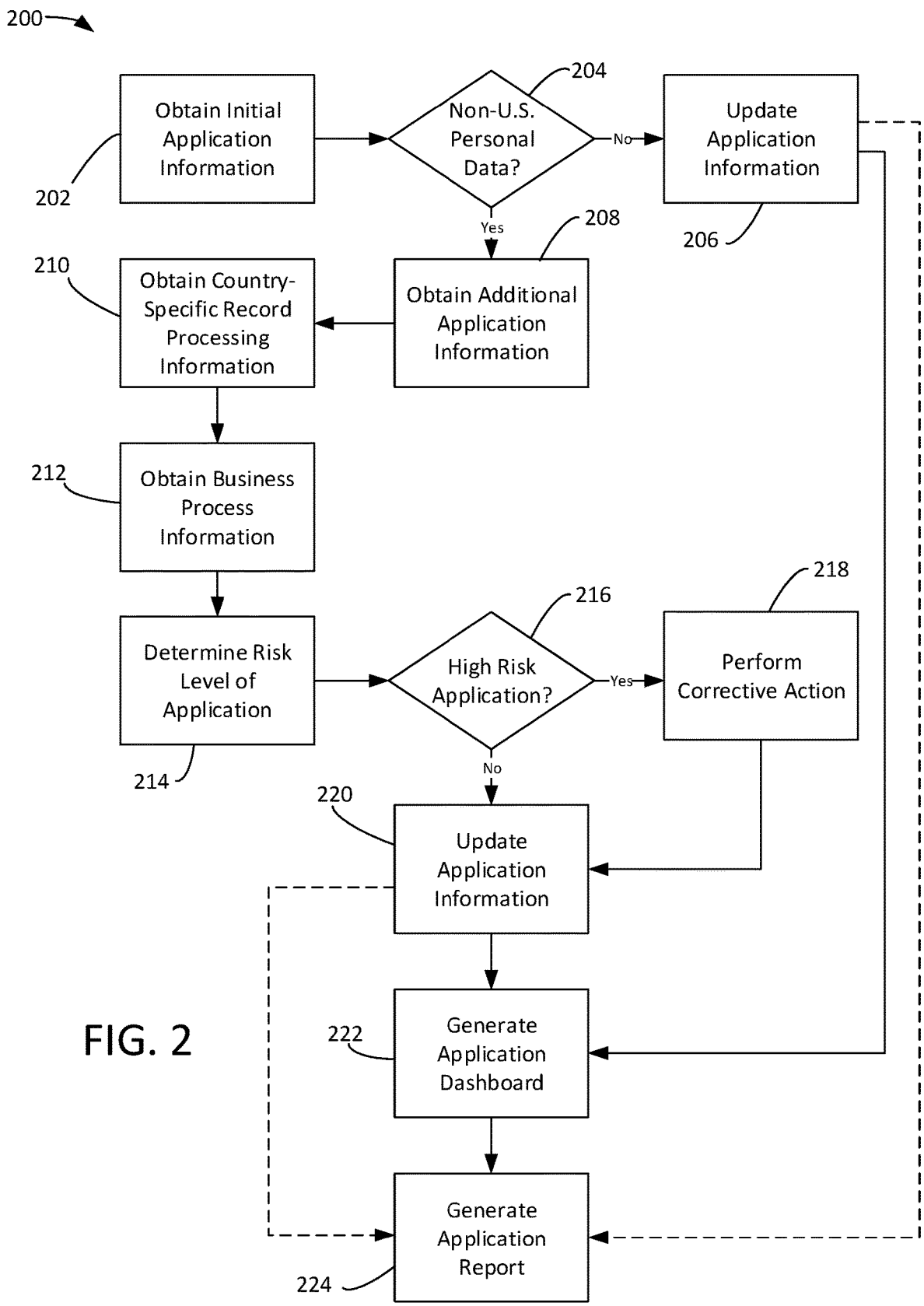
FIG. 2 is a flow diagram of a method of managing customer information, according to an example embodiment.

Referring now to FIG. 2, a flow diagram of a method 200 of managing the use, access, transferring, and processing of customer information by various applications of a global enterprise (e.g., the provider institution or data management security institution associated with the data management computing system 102) is shown, according to an example embodiment. In some embodiments, the method 200 is performed by the data management computing system 102. For example, the method 200 may be performed by the processing circuit 112 of the data management computing system 102. In some embodiments, the method 200 is partially performed by the processing circuit 112 of the data management computing system 102 and is partially performed by the processing circuit 134 of one or more provider computing systems 104. While performing the method 200, the data management computing system 102, the provider computing systems 104, and/or the third-party computing systems 106, for example, communicate data over the network 110 using the network interface circuit 111, the network interface circuit 132, and/or the network interface circuit 144, and/or the data management computing system 102, the provider computing systems 104, and/or the third-party computing systems 106 communicate with the regulatory authority computing systems 108 over the network 110 via the regulatory authority API 128.

The method begins when initial application information pertaining to an application associated with or used by the provider computing system 104 is obtained, at step 202. The initial application information pertains to whether the application uses (e.g., accesses, transfers, processes, or otherwise uses) and/or collects (e.g., compiles, stores) non-U.S. customer data. For example, a business owner may be prompted to provide answers to various initial questions pertaining to whether the application uses and/or collects non-U.S. customer data, such as questions directed toward data flow information associated with the application. The data flow information may include a location (e.g., country) of origin for customer information, a location (e.g., country) of termination of customer information, and any intermediary locations (e.g., countries) that use, access, store, and/or process customer information associated with the application.

In some instances, the prompt with the initial questions may be automatically transmitted from the data management computing system 102 (e.g., the data management application 120) to the provider computing system 104 (e.g., the provider operational application 126) on a regular basis (e.g., nightly, weekly, monthly, quarterly, annually). In some instances, the prompt may be selectively transmitted from the data management computing system 102 (e.g., the data management application 120) by a user of the data management computing system 102 in response to a request from one or more regulatory authorities associated with the regulatory authority computing systems 108.

In any case, the business owner may then provide the initial application information via the input/output circuit 136 of the provider computing system 104. The provider computing system 104 (e.g., the provider operational application 126 is then configured to send or transmit the initial application information (e.g., the business owner's responses) to the data management computing system 102 (e.g., the data management application 120).

Once the initial application information has been obtained, the system 100 (e.g., the data management computing system 102) may then determine, based at least in part on the initial application information, whether additional application information is required by determining whether the application uses non-U.S. personal data, at step 204. Upon determining that the application does not use non-U.S. customer data, the data management computing system 102 (e.g., the data management application 120) may determine that additional application information is not required and may be configured to update and/or store the initial application information received from the business owner in the memory 116 (e.g., the data flow database 124) of the data management computing system 102, at step 206.

Upon determining that the application does use or collect non-U.S. customer data, additional application information pertaining to the application associated with the provider computing system 104 is obtained, at step 208. The additional application information may similarly be obtained from the business owner associated with the provider computing system 104. For example, in some instances, the data management application 120 of the data management computing system 102 may be configured to transmit a request for the additional application information to the provider operational application 126 of the provider computing system 104 via the network 110. The provider operational application 126 may then prompt the user (e.g., the business owner) to provide the requested additional application information.

In some instances, the additional application information may include additional application data flow information. If not included in the initial application data flow information, the additional application data flow information may include the location (e.g., country) of origin of the customer information, the location (e.g., country) of termination of the customer information, and any intermediary locations (e.g., countries) where the customer information is used (e.g., accessed, transferred, or processed) or collected. The additional application data flow information may further include data type information and data usage information. The data type information may include what kind of customer information is being used and/or collected. For example, the data type information may include whether the customer information is personal information, sensitive information, or any other classification of customer information.

The data usage information may include, among other things, the legal entity processing the data of the application, a data access type for the application, whether a third party is involved, a data processing type for the application, whether there are external recipients of the customer information, a purpose of use of the customer information, a number of customer accounts associated with the application, and a number of users with access to the customer information. In some instances, this data flow information is provided to the provider operational application 126 by the business owner via the input/output circuit 136 of the provider computing system 104. The provider operational application 126 may then be configured to transmit or send the data flow information to the data management application 120.

Once the additional application information has been obtained or, in some instances, concurrent with the additional application information being obtained, country-specific record processing information pertaining to the application is obtained, at step 210. For example, based on the application information obtained or a location of the provider associated with the provider computing system 104, the various locations (e.g., countries) of use for the application may be identified (e.g., country of origin, country of termination, any intervening countries) by the data management application 120, and country-specific record processing information may be obtained pertaining to the data regulations in each country associated with the application using an SOR feed 121 (e.g., using the global data activity feed).

In some instances, the country-specific record processing information may comprise privacy requirements or laws pertaining to how customer information (e.g., personal information or sensitive information) must be archived, processed, stored, and/or ultimately deleted. For example, various countries may require customer information to be archived or deleted after a predetermined amount of time (e.g., one year, two years, five years). Various countries may also have varying requirements on the use and access of customer information. For example, various countries may require that certain customer information be used or accessed only for pre-authorized reasons and only by pre-authorized personnel.

Business process information pertaining to the application may then be obtained from various system of records feeds, at step 212. For example, the various SOR feeds 121 of the data management application 120 may automatically compile various business process information pertaining to the application. In some instances, the business process information may include various additional application information not provided by the business owner at step 208. For example, based on the various business processes associated with the application, the business process information may include the type data processed by a particular business process associated with the application (e.g., personal information, sensitive information, pseudonymized information, non-pseudonymized information), the purpose of the data processing in the business process, the personnel type authorized to access the data (e.g., management, privacy security officer, global privacy officials) throughout the business process, and a purpose for use related to the business process.

The business process information may further include whether a third party is used or required by a particular business process. If a third party is used or required, the business process information may further include what type of data is used by the third-party vendor, the purpose of use of the data by the third-party vendor, how many users of the third-party vendor will have access to the data, how the data is being used or processed by the third-party vendor, how the data is being destroyed, deleted, or returned to the data management provider associated with the data management computing system 102 after the third-party vendor is finished using it.

The business process information may further include whether or not there are any non-vendor external recipients of the data. If there are non-vendor recipients of the data, the business process information may similarly include what type of data is provided to the non-vendor recipient, the purpose of the non-vendor recipient receiving the data, how many users at the non-vendor recipient will have access to the data, how the data is used or processed by the non-vendor recipients, and how the data is destroyed, deleted, or returned to the data management provider associated with the data management computing system 102 after the non-vendor recipient is finished using it.

Once the additional application information has been obtained, at step 208, the country-specific record processing requirements have been obtained, at step 210, and the business process information has been obtained at step 212, the risk level of the application may be determined (e.g., high risk, medium risk, low risk), at step 214. For example, the data management application 120 is configured to determine the risk level of the application, at least in part, based on the application information (e.g., the initial application information and the additional application information), the country-specific record processing information, and/or the business process information. In some instances, the data management application 120 is configured to automatically determine the risk level of the application by comparing the application information, the country-specific record processing information, and/or the business process information to predetermined privacy security thresholds based on international privacy laws.

The predetermined privacy security thresholds may pertain to any of the application information, the country-specific record processing information, and the business processing information. For example, one predetermined privacy security threshold may pertain to the number of customer accounts associated with an application (e.g., the number of users whose customer information is used or collected by an application). If the number of customer accounts associated with an application exceeds a predetermined threshold (e.g., over 100 customers, over 1,000 customers, over 10,000 customers), the application may be determined to be a high risk application. Similarly, one predetermined privacy security threshold may pertain to the number of users who have access to the customer information. If the number of users with access to the customer information (e.g. users associated with the provider or business owner associated with the application, any third-party vendors associated with the application, and/or any non-vendor recipients associated with the application) exceeds a predetermined threshold (e.g., over 100, over 1,000, over 10,000), the application may be determined to be a high risk application. Similar predetermined privacy security thresholds may be set for applying low risk and medium risk designations to applications.

In some instances, the predetermined privacy security thresholds may be country-dependent. For example, some countries have more stringent regulations in place for data privacy than others. Various countries may have privacy security rankings determined by the regulatory authorities associated with the regulatory authority computing systems 108. Accordingly, applications that use or collect customer information in lesser regulated countries (e.g., countries having lower privacy security rankings) may have lower predetermined thresholds than those set in more regulated countries (e.g., countries having higher privacy security rankings).

In some instances, the predetermined privacy security thresholds may be dependent, in part, on the type of customer information being used or collected. For example, if the customer information being used or collected is highly sensitive, lower predetermined privacy security thresholds may be set. Similarly, if the customer information being used or collected is not highly sensitive, high predetermined privacy security thresholds may be set. Further, if the customer information has been pseudonymized, the risk associated with that customer information may be lower, so higher predetermined privacy security thresholds may be set.

In some instances, the predetermined privacy security thresholds may be dependent, in part, on how the data is being used or collected by the application. For example, if an application merely stores the data and returns the data to the data management provider associated with the data management computing system 102, the predetermined privacy security thresholds may be higher than an application that actively accesses and/or processes the data. Additionally, the predetermined privacy security thresholds may be lowered in the case that a third-party vendor or a non-vendor recipient is involved with the application. That is, due to the potential added risk of a third-party vendor or a non-vendor recipient, the predetermined privacy security thresholds may be lower for applications involving third-party vendors or non-vendor recipients than for applications that do not involve third-party vendors or non-vendor recipients.

The data management application 120 may then determine whether or not the application is a high risk application, at step 216. If the application is determined to be a high risk application, corrective action may be performed at step 218. For example, the data management application 120 may be configured to provide a prompt for corrective action by a user of the provider computing system 104. In some instances, the corrective action may be to perform a data protection impact assessment (DPIA), a legitimate interest assessment (LIA), and implement necessary changes to the application to minimize the risk associated with the application. It should be appreciated that the corrective action may further include various additional assessments other than the DPIA and the LIA. Accordingly, various additional assessments may also be performed in response to an application being designated as a high risk application.

The DPIA is a process and/or report for identifying and minimizing data protection risks associated with an application or business process. The DPIA may be performed by the business owner or provider associated with the application, along with a regional data privacy officer. Among other things, through performing the DPIA, the business owner or provider and the regional data privacy officer may identify and assess individual risks within the application. The business owner or provider and the regional data privacy officer may then identify any necessary changes and/or additional security measures to eliminate or mitigate those risks. The DPIA results may be subsequently entered into the provider operational application 126 by the business owner or provider or the regional data privacy officer via the input/output circuit 136 of the provider computing system 104. The DPIA results may then be transmitted or sent from the provider operational application 126 to the data management application 120 via the network 110.

The LIA is a process and/or report for assessing whether the processing of the customer information is in pursuit of a legitimate interest, whether the particular type of processing of the customer information is necessary for that pursuit, and whether the legitimate interest is overridden by the rights of the customer whose information is being processed. Similarly, the LIA may be performed and/or reviewed by the business owner or provider and the regional data privacy office. Among other things, through performing the LIA, the business owner or provider and the regional data privacy officer may identify necessary changes and/or additional security measures to eliminate or mitigate unnecessary risks. The LIA results may be subsequently entered into the provider operational application 126 by the business owner or provider or the regional data privacy officer via the input/output circuit 136 of the provider computing system 104. The LIA results may then be transmitted or sent from the provider operational application 126 to the data management application 120 via the network 110.

Once the DPIA and LIA have been performed (as well as any other risk assessments deemed necessary), the necessary changes and/or additional measures for mitigating risks may be implemented by the business owner or provider, the regional data privacy office, and/or a user of the data management computing system 102. The necessary changes and/or the additional measures may pertain to the applications themselves, as well as to sub-applications, connected systems, and/or data warehouses associated with the applications. The necessary changes and/or the additional measures may further be determined on a case-by-case basis dependent on the application.

In some instances, the business owner or provider and/or the regional data privacy officer may perform a data access review (e.g., a review of user access to the customer information). For example, a review of which users have access to the customer information may be performed, and users deemed to not require access to the customer information to perform their roles within the application may have their access revoked. In some instances, the business owner or provider and/or the regional data privacy office may perform a risk acceptance review (e.g., a review of any risk acceptances or allowances that have been implemented in a given application). If the risk acceptances or allowances are deemed to be inadequate for protecting customer information or if they are deemed to be unnecessary, the risk acceptances or allowances may be removed from the application process. In some instances, the business owner or provider and/or the regional data privacy officer may perform a third-party vendor usage review (e.g., a review of the third-party vendors and/or the non-vendor recipients associated with the application). For example, a review of third-party vendors and/or non-vendor recipients associated with the application may be performed, and third-party vendors and/or non-vendor recipients deemed to be non-essential may have their access to customer information revoked. In some instances, if various user, third-party vendor, or non-vendor recipient usage or access to customer information is deemed essential to a particular application, the customer information may be pseudonymized to reduce any potential risks associated with user, third-party vendor, or non-vendor recipient usage or access to the customer information.

Once the corrective action has been performed, at step 218, or if the application is determined to be a low or medium risk application (e.g., not a high risk application), at step 216, the data management computing system 102 (e.g., the data management application 120) may be configured to update and/or store the application information, the country-specific record processing information pertaining to the application, and the business process information pertaining to the application in the memory 116 (e.g., the data flow database 124) of the data management computing system 102, at step 220.

Once the application information has been updated and/or stored, at step 206, or the application information, the country-specific record processing information pertaining to the application, and the business process information pertaining to the application has been updated and/or stored, at step 220, the data management computing system 102 (e.g., the data management application 120) may be configured to generate various user navigable application dashboards, at step 222. The navigable dashboards may provide various displays to the data management computing system 102 that allow a user of the data management computing system 102 to view, manage, and choose various reports to generate pertaining to a variety of applications associated with the data management computing system 102. For example, a multitude of applications may have corresponding application information, country-specific record processing information, and business process information entered into the data management computing system 102, as described above with reference to steps 202-220, and the dashboards generated at step 222 may include information pertaining to each of the applications entered into the data management computing system 102. The navigable dashboards, as well as their functionality, will be further discussed below, with reference to FIGS. 3-14.

Once the various navigable dashboards have been produced, at step 222, the data management computing system 102 (e.g., the data management application 120) may be configured to produce various application reports, at step 224. The reports may contain various information pertaining to the various applications entered into the data management computing system 102. For example, the generated reports may include record of processing reports, LIA reports, DPIA reports, certification completion reports, cross border application registry details reports, and various other reports desired for a given scenario, as will be discussed below. In some instances, the reports may be generated in response to a user request provided by a user of the data management computing system 102 via the input/output circuit 113 of the data management computing system 102.

In some instances, the reports may be automatically generated by the data management computing system 102 on a predetermined schedule (e.g., daily, weekly, monthly) based on preset report schedules provided to the data management application 120 by a user of the data management computing system 102. Accordingly, as indicated by the dashed lines in FIG. 2, in some instances, application reports may automatically be generated, at step 224, after the application information has been updated and/or stored for each relevant application, at step 206, or after the application information, the country-specific record processing information, and the business process information has been updated and/or stored for each relevant application, at step 220. In some instances, the generated application reports may be provided to various regulatory authorities upon request by sending or transmitting the application reports from the data management application 120 to the regulatory authority computing systems 108 (e.g., using the regulatory authority APIs 128) via the network 110.

Referring now to FIGS. 3-14, user interfaces displayable on the data management computing system 102 via the data management application 120 are shown, according to an example embodiment. The user interfaces can be generated based on processes performed by the processing circuit 112 of the data management computing system 102. Further, FIGS. 3-14 illustrate the interface of the data management application 120 of the data management computing system 102, and the information provided from the data flow database 124. In some instances, various aspects of the data management application 120 may be viewable and/or accessible by a user of the provider computing system 104 via the provider operational application 126. As such, although the following description references the data management application 120 and the data management computing system 102, it will be understood that the various dashboards and reports may be similarly viewable and/or accessible by a user of the provider computing system 104. As alluded to above, due to the sensitive nature of various information processed and/or handled by the data management application 120, access to various information and/or functionality of the data management application 120 is role-based, such that only users within specified user groups having authorized credentials (e.g., verified through a login process) are allowed to access sensitive information and/or use certain functions provided by the data management application 120. For example, various reports may be accessible only to the specified user groups having authorized credentials.

Referring now to FIGS. 3, 8, 9, and 12, in some embodiments, the data management application 120 is configured to provide a system of record (SOR) dashboard 300. The SOR dashboard 300 may include various data management page tabs 301 configured to allow a user to selectively navigate between pages associated with the SOR dashboard 300. As illustrated, the data management page tabs 301 may provide access to selectable pages including a view entries page 302 (shown in FIG. 3), a structured business process page 304 (shown in FIG. 8), a DPIA page 306 (shown in FIG. 9), and an LIA page 308 (shown in FIG. 12). Each of the various pages associated with the SOR dashboard 300 may include various application information fields 310 having pertinent information preloaded or enterable therein.

Figure 3:
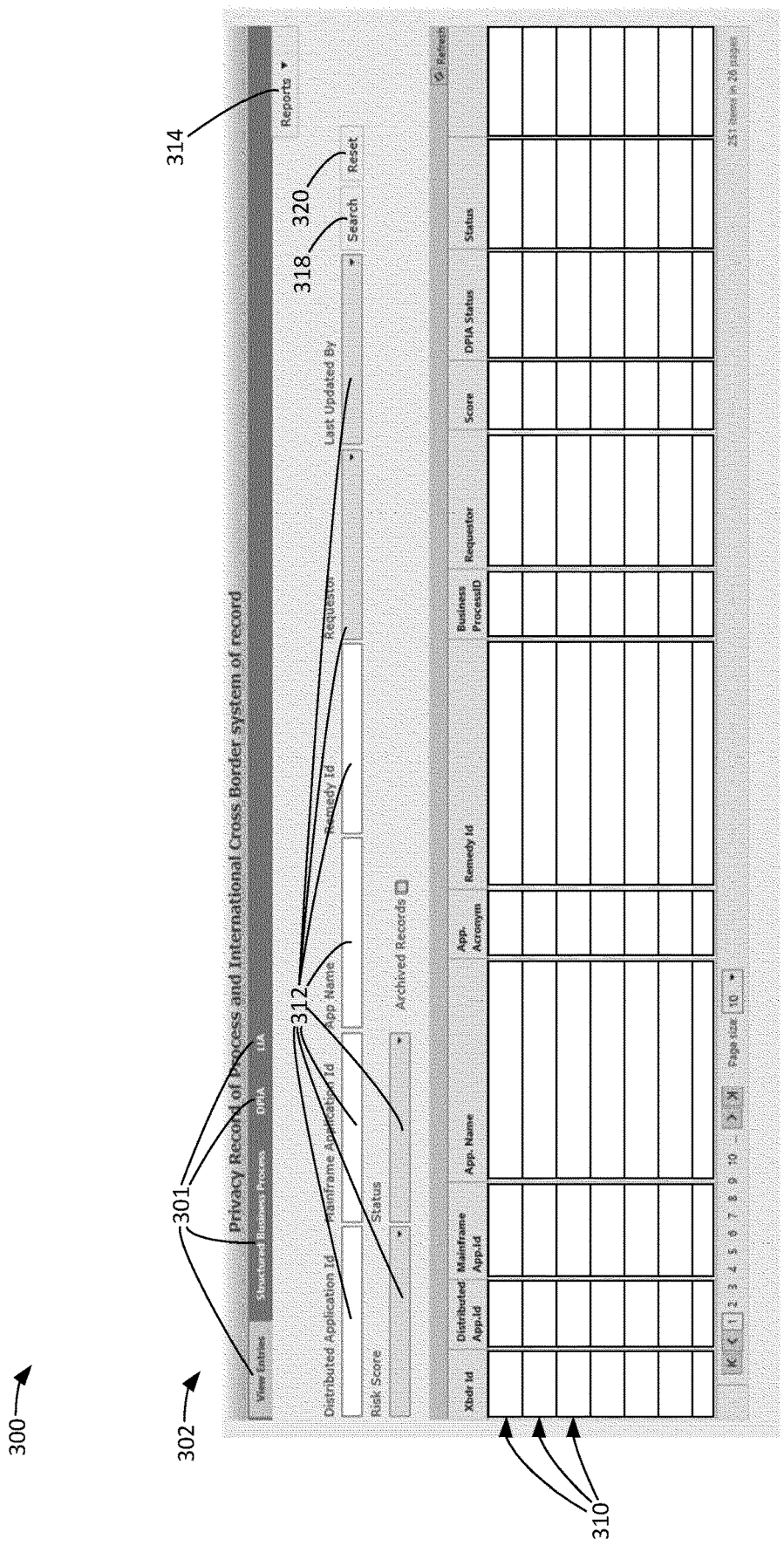
FIG. 3 is a view entries page of a system of record dashboard provided by a data management application shown on a user interface, according to an example embodiment.

For example, referring now to FIG. 3, the view entries page 302 may include various data management search fields 312, application information fields 310, and a reports dropdown box 314. The various data management search fields 312 may allow a user of the data management application 120 to input (e.g., via the input/output circuit 113) a set of criteria to find a particular application or a particular set of applications to view and/or generate reports on. For example, the data management search fields 312 may include fields for various application identification numbers, application names, risk scores, application statuses, and so on for a user of the data management application 120 to find their desired application or application set. Once the user has entered the desired search criteria into the various data management search fields 312, the user may click on a search button 316 to enter the search criteria. The user may also click on a reset button 318 to erase the entered search criteria from the data management search fields 312.

Once the search criteria has been entered by the user, the application information may then be populated into the various application information fields 310. The various application information fields 310 may be sorted into rows of information pertaining to individual applications. The application information displayed in each row may similarly include the various application identification numbers, applications names, risk scores, application statuses, and so on. It should be appreciated that various additional information may be displayed in the application information fields 310, as desired for a particular situation or application.

Similarly, once the search criteria has been entered by the user and the various application information fields 310 have been populated, the user may select to produce various reports by clicking on the reports dropdown box 314 and selecting a desired report from a list of potential reports. For example, the list of desired reports may include a cross border application registry details report, a record of processing report, a certification completion report, an LIA report, a DPIA report, or any other desired reports for a given scenario.

These various reports may include the information contained within the application information fields 310. The various reports may further include a summary of each application, a list of any business processes associated with each application, various corrective actions performed for each application, whether a third-party vendor is associated with each application, a designation of a data controller associated with each application, an indication of whether each application has been certified (e.g., by the data management provider associated with the data management computing system 102), who last updated the information pertaining to each application, a legal entity associated with each application, an indication of whether customer information crosses international borders within each application, a location or country of origin for the application, a country of termination for each application, a number of customers associated with each application, a number of users with access to customer information within each application, how customer information is destroyed within each application, as well as any other pertinent information desired for a given scenario.

In some instances, the various reports may be provided to regulatory authorities upon request to prove or ensure compliance with various data protection regulations, as well as to prove or ensure proper use of customer data. Various reports may also be provided periodically to stakeholders of the provider associated with the data management computing system 102 and/or any of the provider computing systems 104.

In some instances, various reports may be provided to privacy leaders and/or information security teams associated with the data management computing system 102 and/or the provider computing systems 104 to ensure that the data integrity and data quality are accurate within the reports. The privacy leaders and/or information security teams may also use the reports as an oversight or a second line of defense (e.g., apart from standard data privacy procedures already in place) for data privacy associated with international operations of the data management provider of the data management computing system 102 or the provider of the provider computing systems 104. For example, in some instances, the information security teams associated with the data management computing system 102 and/or the provider computing systems 104 may use the reports to review and ensure the implementation of proper security controls around the various applications and information contained within those applications.

The various reports may be generated and provided to the information security teams on a regular basis (e.g., nightly, weekly, monthly) and the information security teams may take action to ensure that proper security measures are in place or are implemented. Additionally, if a change or update is made to application information, a corresponding report may be provided to the information security teams, and the information security teams may review the report to ensure that the change or update is accurate. Further, if a change or update to an application alters the risk level calculated by the data management application 120 for that application, an automatic prompt for review of the application information may be triggered by the data management application 120 for additional review of the application and any associated reports.

Referring now to FIGS. 4-7, in some embodiments, the data management application 120 is configured to provide an application information viewing dashboard 400 for any application selected from the application information fields 310 on the view entries page 302 of the SOR dashboard 300. For example, each of the application information fields 310 may be linked or clickable, and the data management application 120 may be configured to provide the corresponding application information viewing dashboard 400 as a pop-up window when the user clicks on a particular one of the application information fields 310. The application information viewing dashboard 400 may include various application information page tabs 402 providing selectable access to various pages associated with the application information viewing dashboard 400. Each page associated with the application information page tabs 402 includes various information fields 404. The information fields 404 on each of the pages may have information pre-loaded therein or may allow for additional or updated information to be entered therein by a user of the data management application 120.

The various application information page tabs 402 may provide a set of pages including application-specific information that are selectable for viewing by a user of the data management application 120. As illustrated, the selectable pages may include an application process page 406 (FIG. 4), an application detail page 408 (FIGS. 5A and 5B), an application process audit page 410 (shown in FIG. 6), and an application detail audit page 412 (shown in FIG. 7).

Figure 4:
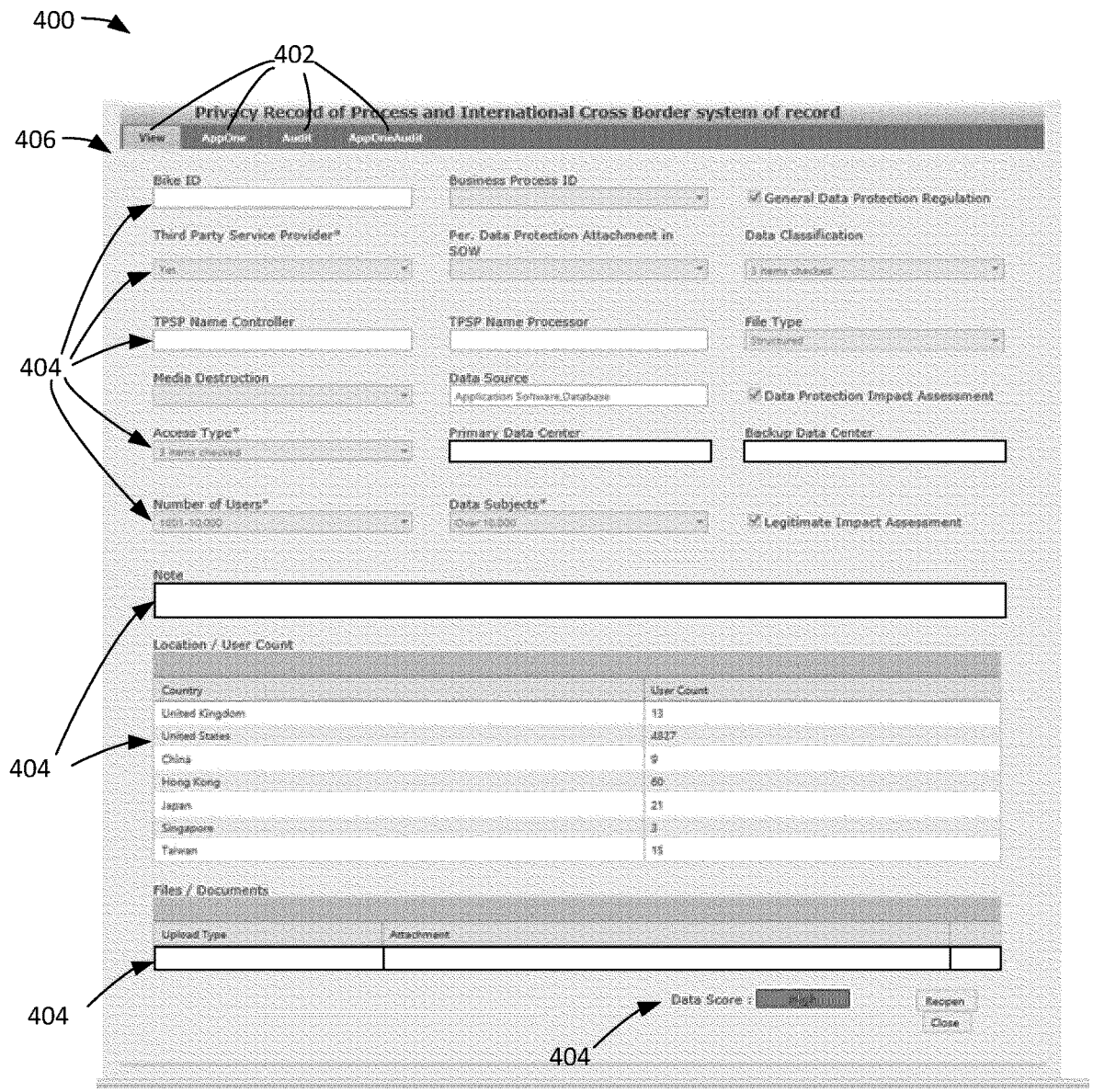
FIG. 4 is an application process page of an application information viewing dashboard provided by the data management application shown on the user interface, according to an example embodiment.

Referring to FIG. 4, the application process page 406 includes the information fields 404. Along with various identification information pertaining to the application (e.g., application name and associated alphanumeric identification IDs), the information fields 404 on the application process page 406 may include process-related information pertaining to the selected application. For example, the information fields 404 of the application process page 406 may include whether there is a third-party vendor associated with the application, an indication of whether a DPIA/LIA has been performed, the type of data used or collected, how the data is destroyed, where the data comes from, what type of data use or access is performed, the number of users with access to customer information, the number of customers associated with the application, a user count by country for the application, a risk score associated with the application, and links to any pertinent files or documents related to the application. Various other information may also be included in the application process page 406.

Figure 5A:
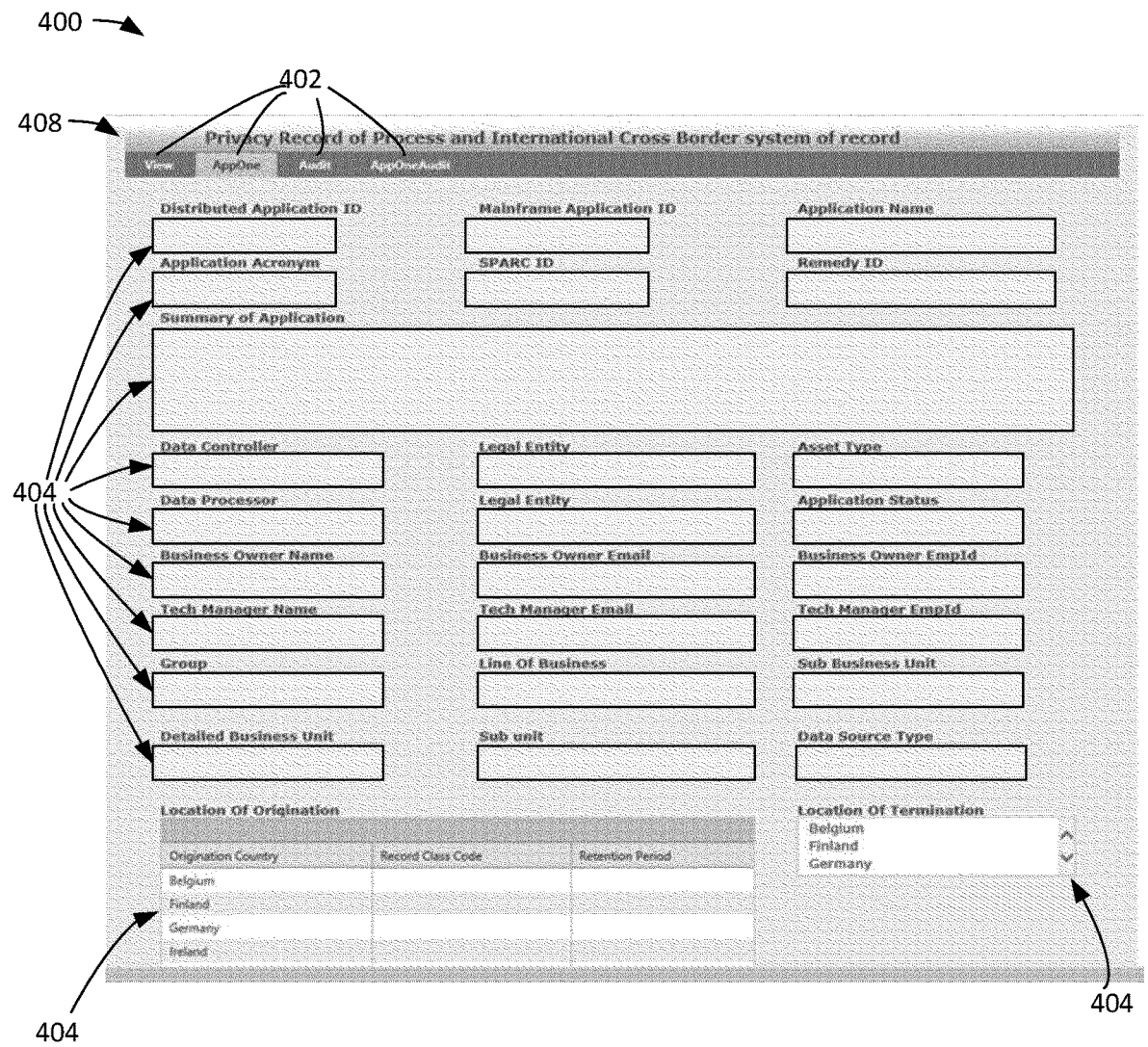
FIG. 5A is a first portion of an application detail page of the application information viewing dashboard provided by the data management application shown on the user interface, according to an example embodiment.
Figure 5B:
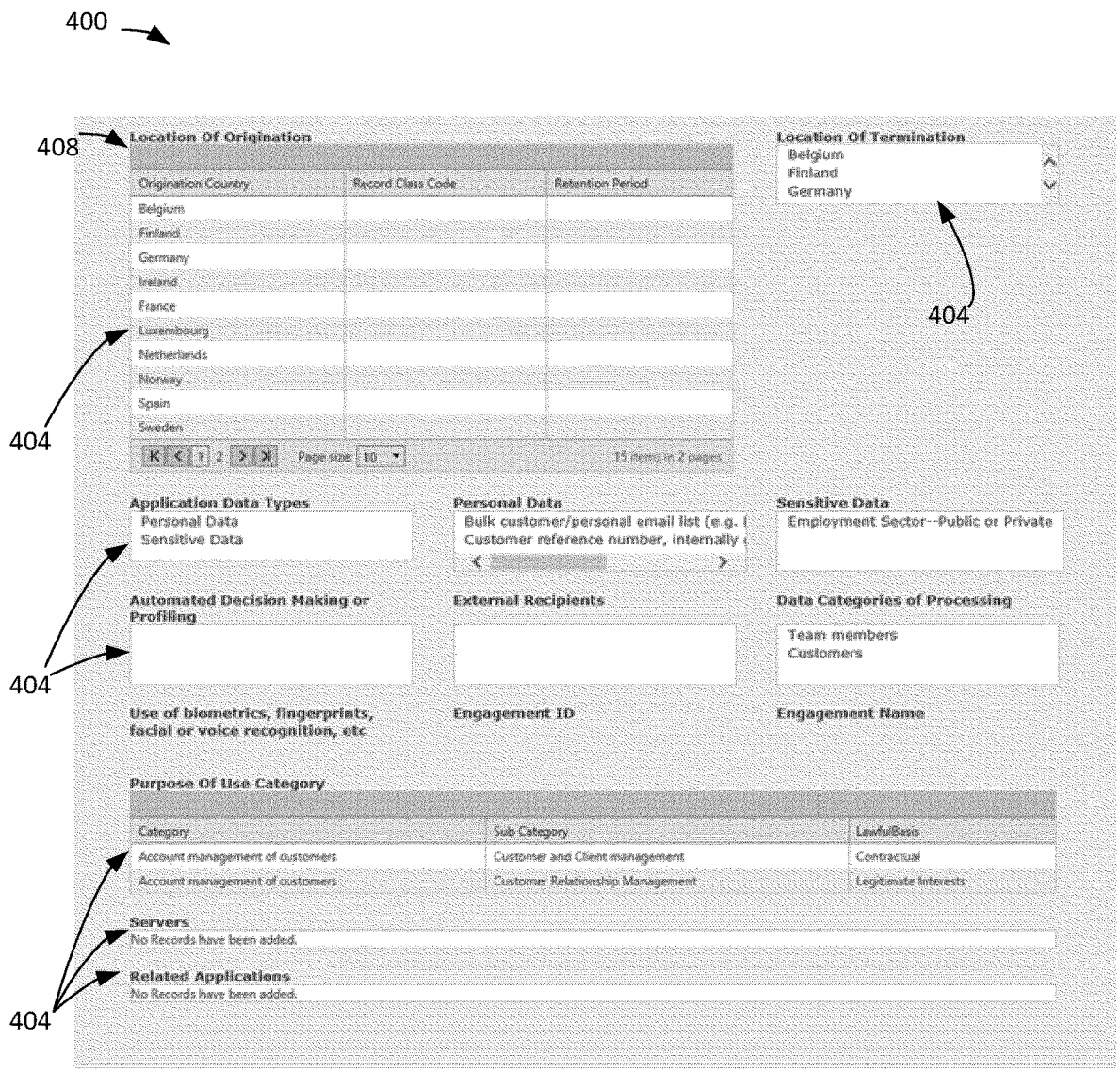
FIG. 5B is a second portion of the application detail page of the application information viewing dashboard provided by the data management application shown on the user interface, according to an example embodiment.

Referring now to FIGS. 5A and 5B, the application detail page 408 includes the information fields 404. Along with various identification information pertaining to the application, the information fields 404 on the application detail page 408 may include application-specific details pertaining to the application. For example, the information fields 404 of the application detail page 408 may include an application summary, a data controller, a data processor, an asset type, an application status, a legal entity, business owner information, tech manager information, associated organizational information (e.g., group, line of business, sub business unit(s)), data source types, location(s) of origination, location(s) of termination, application data types, personal data used or collected, sensitive data used or collected, whether automated decision making or profiling is used, whether there are external recipients, categories of data processing, use of biometrics, purpose of use, lawful basis of use (e.g., contractual, legitimate interests), servers used, and related applications. Various other information may also be included in the application detail page 408.

Figure 6:
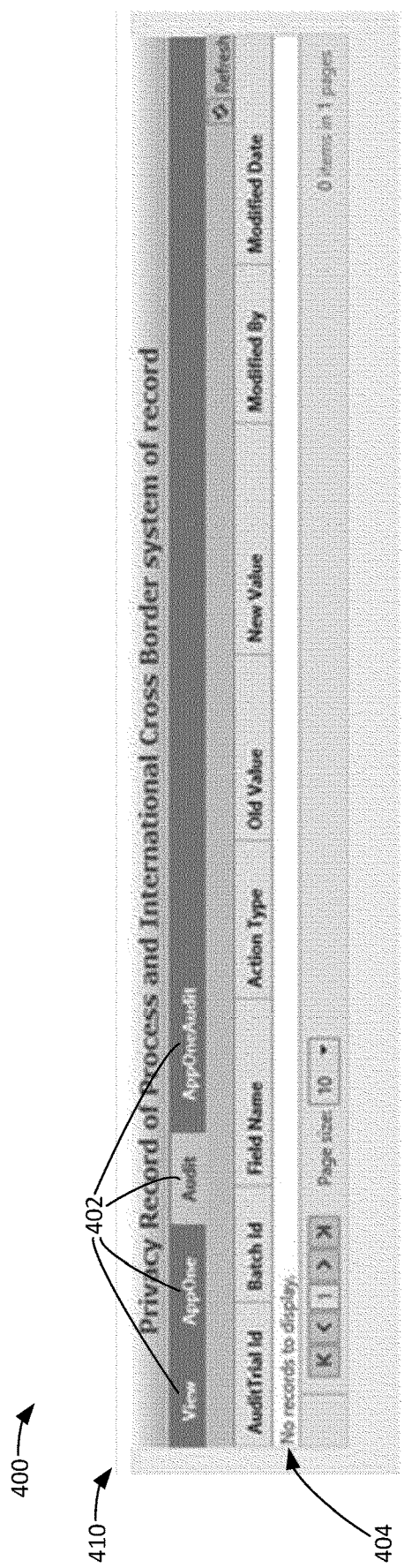
FIG. 6 is an application process audit page of the application information viewing dashboard provided by the data management application shown on the user interface, according to an example embodiment.
Figure 7:
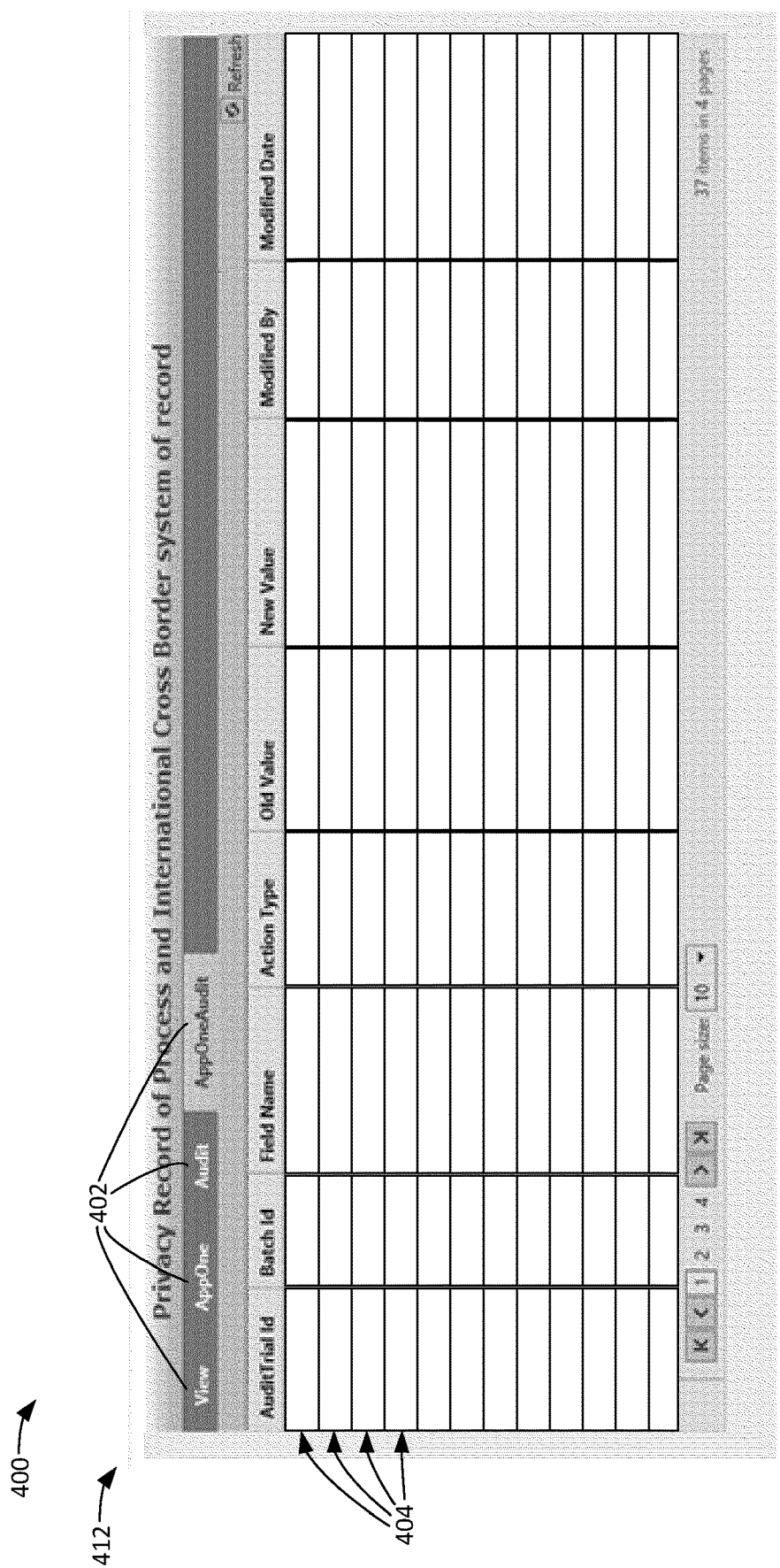
FIG. 7 is an application detail audit page of the application information viewing dashboard provided by the data management application shown on the user interface, according to an example embodiment.

Referring now to FIGS. 6 and 7, the application process audit page 410 and the application detail audit page 412 each include corresponding information fields 404. Along with various identification information pertaining to the application, the information fields 404 on the application audit pages 410, 412 may include various information pertaining to audits, modification, updates, and/or changes to the application. For example, the information fields 404 may include information to what type of audit was performed, what type of action (e.g., corrective action) has been taken pertaining to the application, any changes made to the applications (e.g., signified by an old value pertaining to an aspect of the application and a new value pertaining to the same aspect), who performed the audit, modification, update, and/or change, and when the audit, modification, update, and/or change was performed.

Figure 8:
FIG. 8 is a structured business process page of the system of record dashboard provided by the data management application shown on the user interface, according to an example embodiment.

Referring now to FIG. 8, the structured business process page 304 similarly includes application information fields 310. The application information fields 310 of the structured business process page 304 may include business process information pertaining to various business processes associated with an application or a plurality of applications. Once the search criteria has been entered by the user in the view entries page 302 of the SOR dashboard 300, the various application information fields 310 of the structured business process page 304 may auto-populate with various information. For example, the business process information may include a business process identification, a name of the business process, a status of the business process, and various other information.

Figure 9:
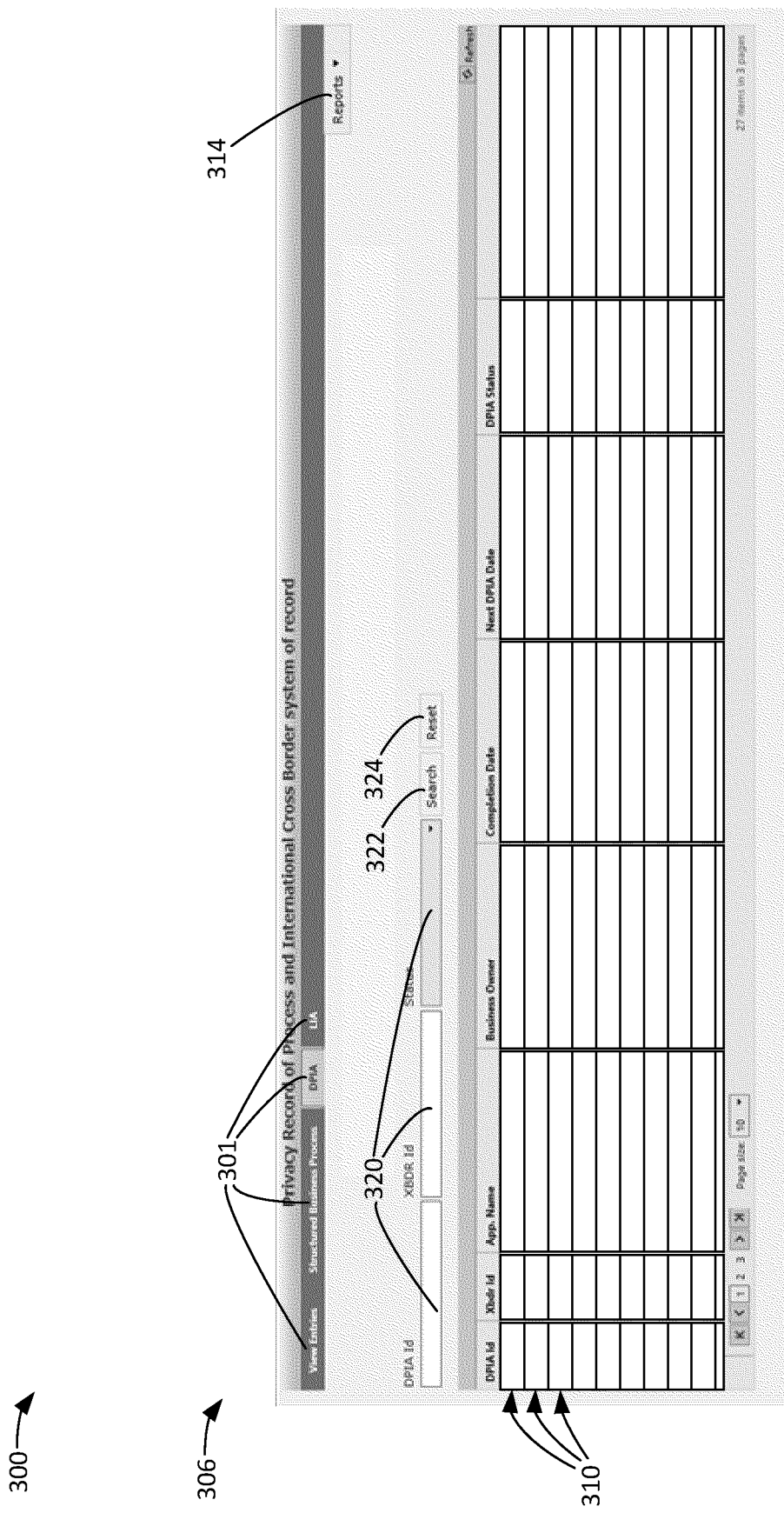
FIG. 9 is a data protection impact analysis (DPIA) page of the system of record dashboard provided by the data management application shown on the user interface, according to an example embodiment.

Referring now to FIG. 9, the DPIA page 306 includes DPIA information search fields 320, a search button 322, a reset button 324, and application information fields 310. The DPIA information search fields 320 may similarly allow a user of the data management application 120 to input a set of criteria to further narrow down their search for a particular application or set of applications. For example, the DPIA information search fields 320 may include fields for various identification codes and/or application statuses. Once the user has entered the desired search criteria into the DPIA information search fields 320, the user may click the search button 322 to enter the search criteria or the reset button 324 to erase the entered search criteria from the DPIA information search fields 320.

The application information fields 310 of the DPIA page 306 may include various DPIA and application identification codes, application names, a business owner associated with the application, a DPIA completion date, a scheduled date of a next DPIA, and a DPIA status. In some instances, the application information fields 310 of the DPIA page 306 may include additional information.

Figure 10:
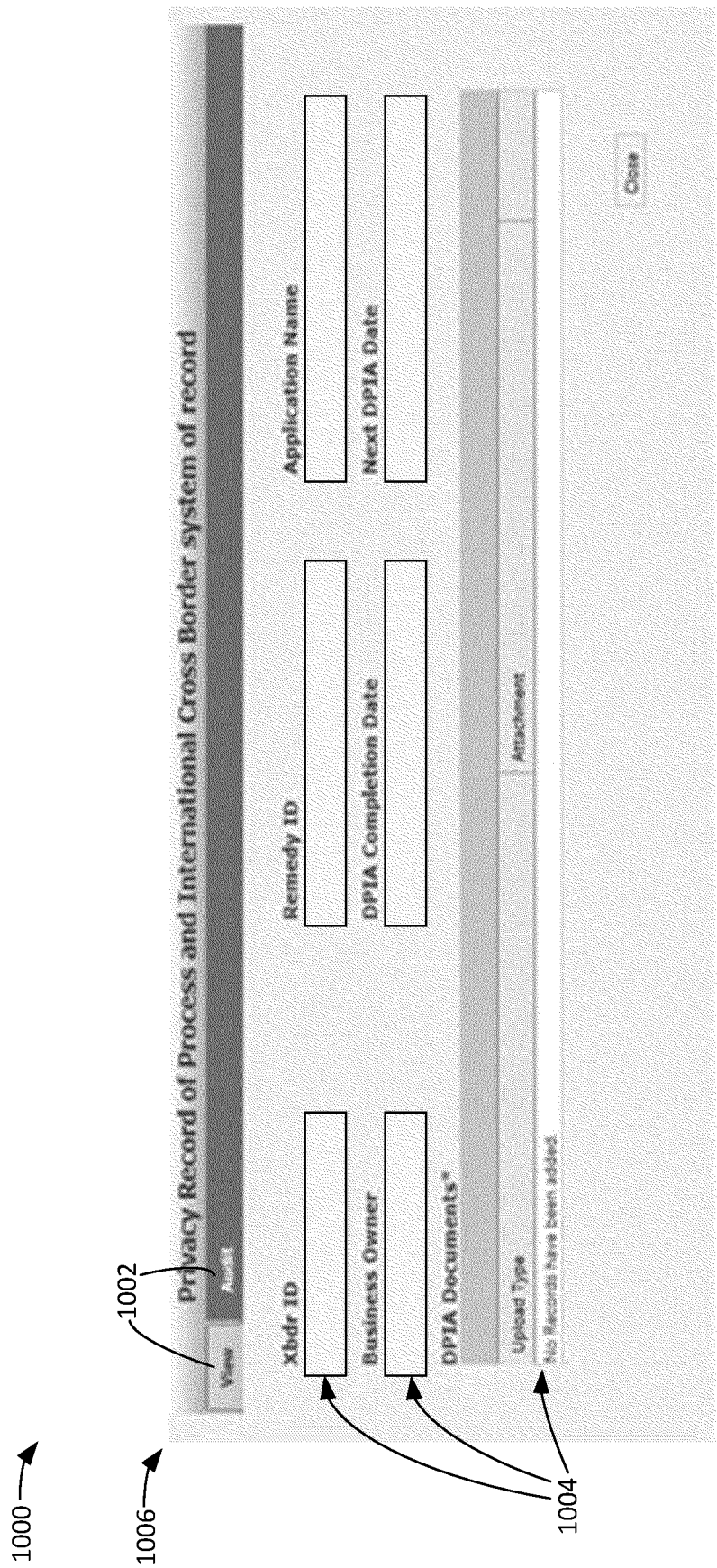
FIG. 10 is a DPIA information page of a DPIA information viewing dashboard provided by the data management application shown on the user interface, according to an example embodiment.
Figure 11:
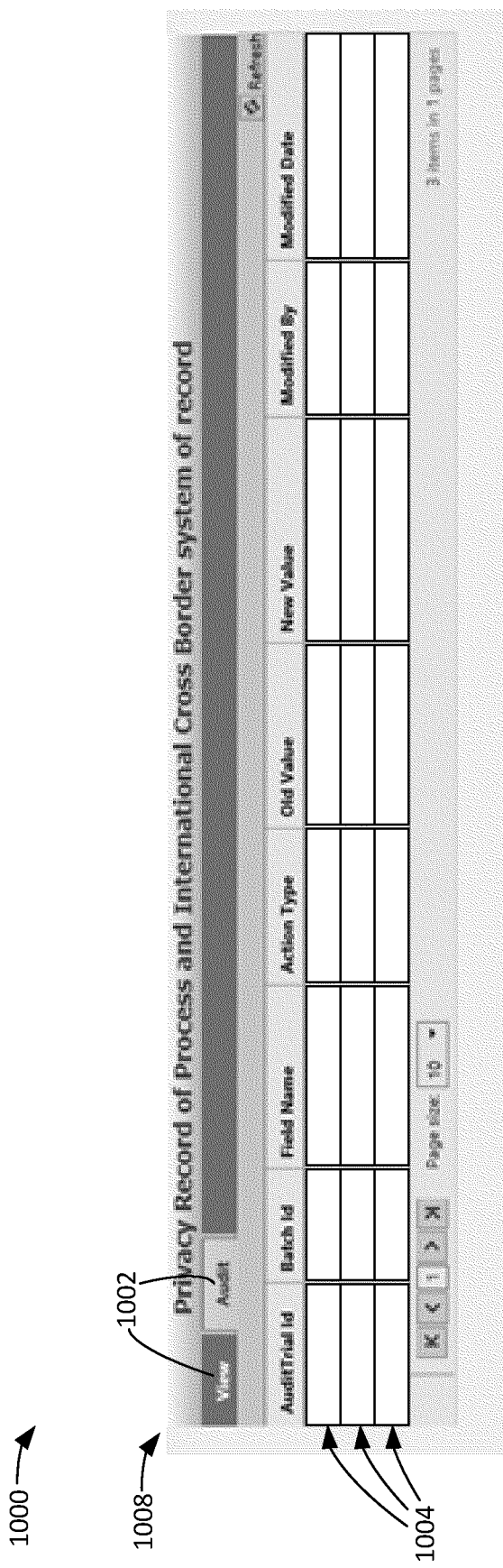
FIG. 11 is a DPIA audit page of the DPIA information viewing dashboard provided by the data management application shown on the user interface, according to an example embodiment.

Referring now to FIGS. 10 and 11, in some embodiments, the data management application 120 is configured to provide a DPIA information viewing dashboard 1000 for any application selected from the application information fields 310 on the DPIA page of the SOR dashboard 300. For example, each of the application information fields 310 on the DPIA page 306 may be linked or clickable, and the data management application 120 may be configured to provide the DPIA information viewing dashboard 1000 as a pop-up window when the user clicks on a particular one of the application information fields 310. The DPIA information viewing dashboard 1000 may similarly include various DPIA information page tabs 1002 providing selectable access to various pages associated with the DPIA information viewing dashboard 1000. Each page associated with the DPIA information page tabs 1002 includes various information fields 1004. The information fields 1004 on each of the pages may have information pre-loaded therein or may allow for additional or updated information to be entered therein by a user of the data management application 120.

The various DPIA information page tabs 1002 may provide a set of pages including DPIA-specific information pertaining to a selected application. As illustrated, the selectable pages may include a DPIA information page 1006 (shown in FIG. 10) and a DPIA audit page 1008 (shown in FIG. 11). Referring now to FIG. 10, the information fields 1004 on the DPIA information page 1006 may pertain to various DPIA-related application information. For example, the information fields 1004 on the DPIA information page 1006 may include various application identification codes, the application name, the business owner, a DPIA completion date, a scheduled date of a next DPIA, and links to any relevant uploaded DPIA documents.

Referring now to FIG. 11, the information fields 1004 on the DPIA audit page 1008 may pertain to various DPIA audit information pertaining to a selected application. For example, the information fields 1004 on the DPIA audit page 1008 may include various application identification codes, a field name associated with the application, an action type (e.g., corrective action) identified, any changes made to the application (e.g., signified by an old value pertaining to an aspect of the application and a new value pertaining to the same aspect), who performed the audit, and when the audit was performed.

Figure 12:
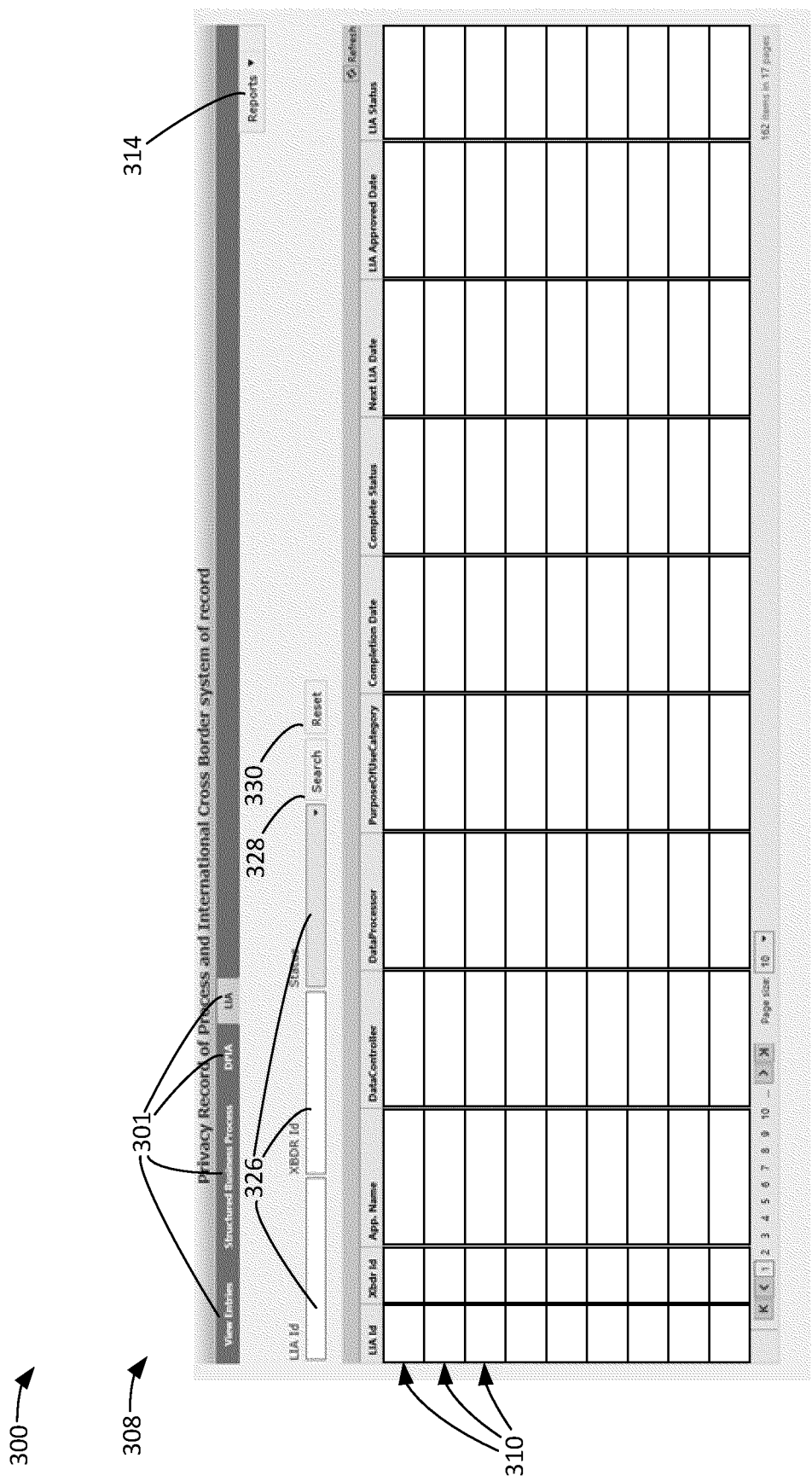
FIG. 12 is a legitimate interest assessment page of the system of record dashboard provided by the data management application shown on the user interface, according to an example embodiment.

Referring now to FIG. 12, the LIA page 308 may include various LIA information search fields 326, a search button 328, a reset button 330, and various application information fields 310. The LIA information search fields 326 may similarly allow a user of the data management application 120 to input a set of criteria to further narrow down their search for a particular application or set of applications. For example, the LIA information search fields 326 may include fields for various identification codes and/or application statuses. Once the user has entered the desired search criteria into the LIA information search fields 326, the user may click the search button 328 to enter the search criteria or the reset button 330 to erase the entered search criteria from the LIA information search fields 326.

The application information fields 310 of the LIA page 308 may include various LIA and application identification codes, application names, a data controller associated with the application, a data processor associated with the application, a purpose of use category, an LIA completion date, a scheduled date of a next LIA, an LIA approval date, and an LIA status. In some instances, the application information fields 310 of the LIA page 308 may include additional information.

Although not depicted herein, it will be appreciated that the data management application 120 may be configured to provide an LIA information viewing dashboard, similar to the DPIA information viewing dashboard 1000, for any application selected from the application information fields 310 on the LIA page 308 of the SOR dashboard 300. Accordingly, each of the application information fields 310 on the LIA page 308 may be linked or clickable, and the data management application 120 may be configured to provide the LIA information viewing dashboard as a pop-up window when the user clicks on a particular one of the application information fields 310. The LIA information viewing dashboard may similarly include a variety of pages including LIA-specific information pertaining to a selected application.

Figure 13:
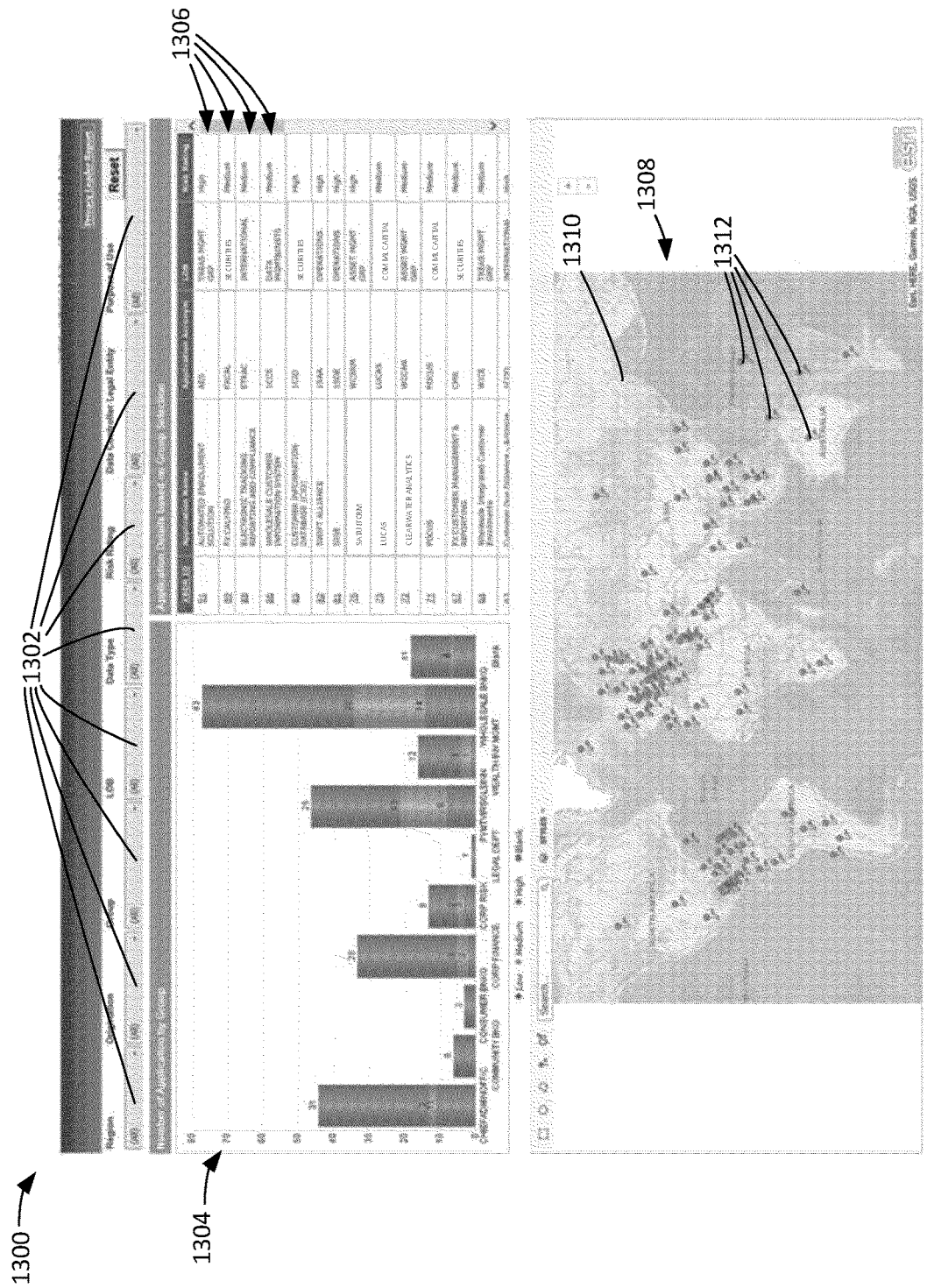
FIG. 13 is a data flow dashboard provided by the data management application shown on the user interface, according to an example embodiment.

Referring now to FIG. 13, in some embodiments, the data management application 120 is configured to provide a data flow dashboard 1300. The data flow dashboard 1300 may include various application sortation drop boxes 1302, an application information chart 1304, various application information fields 1306, and an application mapping field 1308. The various application sortation drop boxes 1302 may allow a user of the data management application 120 to input (e.g., via the input/output circuit 113) various sortation criteria to view information pertaining to a particular application or a particular set of applications. For example, the application sortation drop boxes 1302 may allow the user to sort through applications by region, country of origin, business group, line of business, data type, risk rating, data controller/legal entity, and/or purpose of use of customer information. In some instances, there may be more or less application sortation drop boxes 1302 to allow for additional and/or differing sortation categories.

Once the desired sortation criteria has been entered by the user, the application information chart 1304, the application information fields 1306, and the application mapping field 1308 may be automatically updated by the data management application 120 to reflect the pertinent applications fitting the entered sortation criteria. In some embodiments, the application information chart 1304 may provide a bar chart of the number of applications in each of a plurality of business units. In some embodiments, each bar in the bar chart may be further delineated by color to indicate how many of the applications are a low risk, a medium risk, a high risk, or have yet to be evaluated. Accordingly, the user may quickly ascertain which business units associated with the data management provider of the data management computing system 102 or the provider of the provider computing systems 104 has the most high risk applications. Accordingly, targeted corrective action may be performed within specific business units to more effectively reduce data privacy risks associated with the company or enterprise associated with the data management provider of the data management computing system 102 or the provider of the provider computing systems 104 (which in some cases may be the same entity).

The application information fields 1306 may include various information pertaining to the applications fitting the entered sortation criteria. This information may include any of the same application information discusses above, with reference to the application information fields 310 of the SOR dashboard 300.

The application mapping field 1308 may provide a visual graphic depicting which countries have applications (and therefore customer information) associated with them. For example, the application mapping field 1308 may include a map 1310 (e.g., a global map) having a bunch of application designating pins 1312. The application designating pins 1312 may indicate that an application is associated with the country within which the application designating pin 1312 is placed. Accordingly, the application mapping field 1308 provides the user with a visual representation of where customer information is being used and/or collected geographically (e.g., globally).

Figure 14:
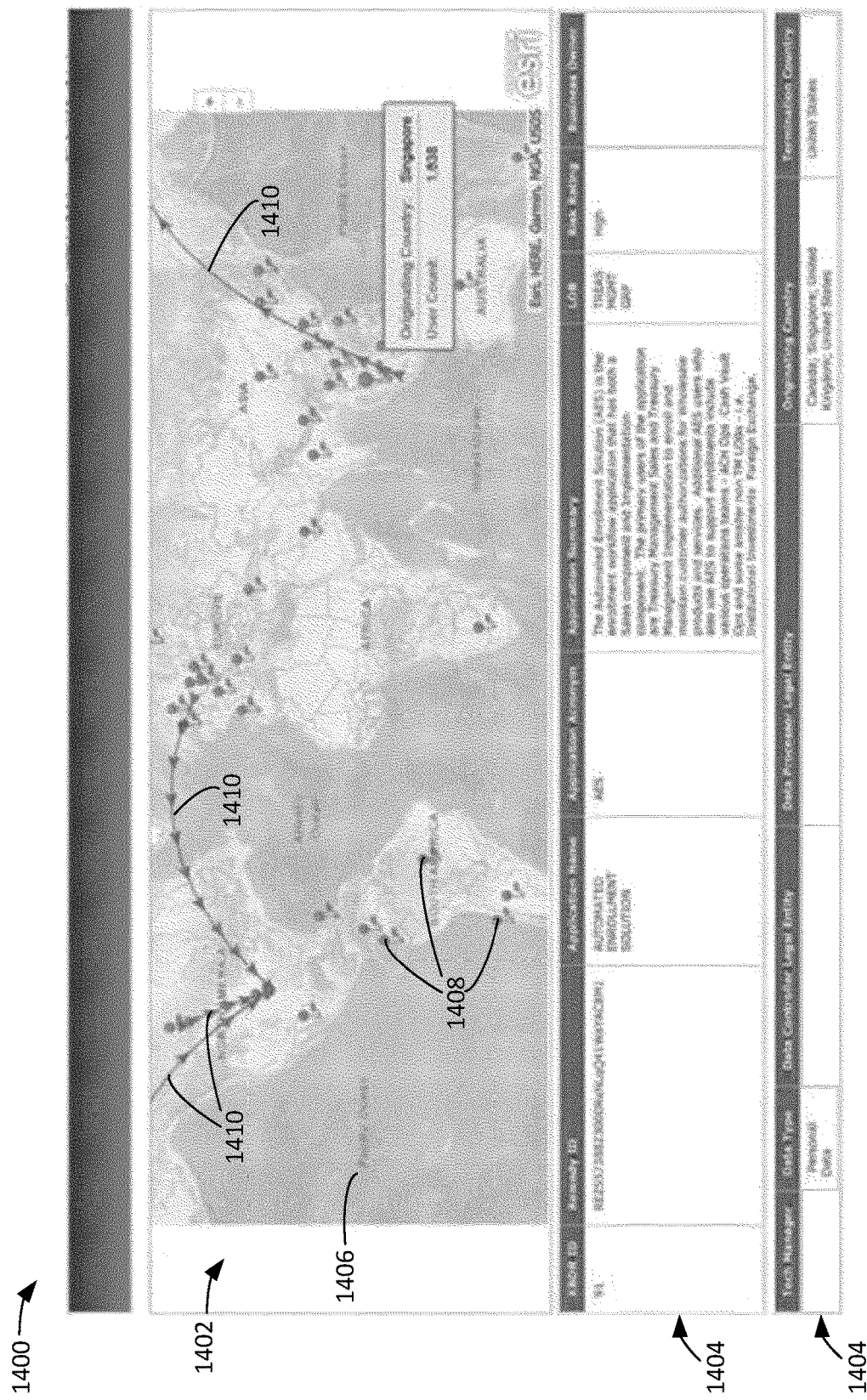
FIG. 14 is an application report provided by the data management application shown on the user interface, according to an example embodiment.

Referring now to FIG. 14, the data management application 120 may be configured to selectively generate an application report 1400 of an application selected from the data flow dashboard 1300. For example, similar to the application information fields 310 of the SOR dashboard 300, each of the application information fields 1306 of the data flow dashboard 1300 may be linked or clickable, and the data management application 120 may be configured to generate the corresponding application report 1400 based on the selected application.

Similar to the reports discussed above, the application report 1400 may include a variety of information pertaining to the selected application. Specifically, the application report 1400 may include a data flow mapping field 1402 and various application information fields 1404. The data flow mapping field 1402 may provide a visual representation of where customer information is used or collected, as well as how the customer information is transferred or shared between various countries (e.g., cross-border customer information transfer) by the application. For example, the data flow mapping field 1402 may include a map 1406 (e.g., a global map), various application designating pins 1408, and application data flow lines 1410.

The map 1406 and application designating pins 1408 may be substantially similar to the map 1310 and the application designating pins 1312 described above. The application data flow lines 1410 indicate the flow of customer information between various application designating pins 1312. For example, in the illustrated example, customer information originates (e.g., is collected) in various countries (e.g., Singapore, Canada, United Kingdom) and terminates in another country (e.g., the United States). Accordingly, application data flow lines 1410 may start in the country or countries of origin and terminate in the country or countries of termination, with arrows indicating the direction of customer information flow. As such, the data flow mapping field 1402 provides the user with a visual representation of both where customer information is being used and/or collected geographically (e.g., globally) and how that customer information is transferred and/or transmitted between various countries.

The various application information fields 1404 may be substantially similar to the application information fields 1306 and/or the application information fields 310 described above, with reference to the data flow dashboard 1300 and the SOR dashboard. Accordingly, the application information fields 1404 may include various information pertaining to the selected application. This information may include any of the same application information discussed above, with reference to application information fields 310 of the SOR dashboard 300.

Figure 15:
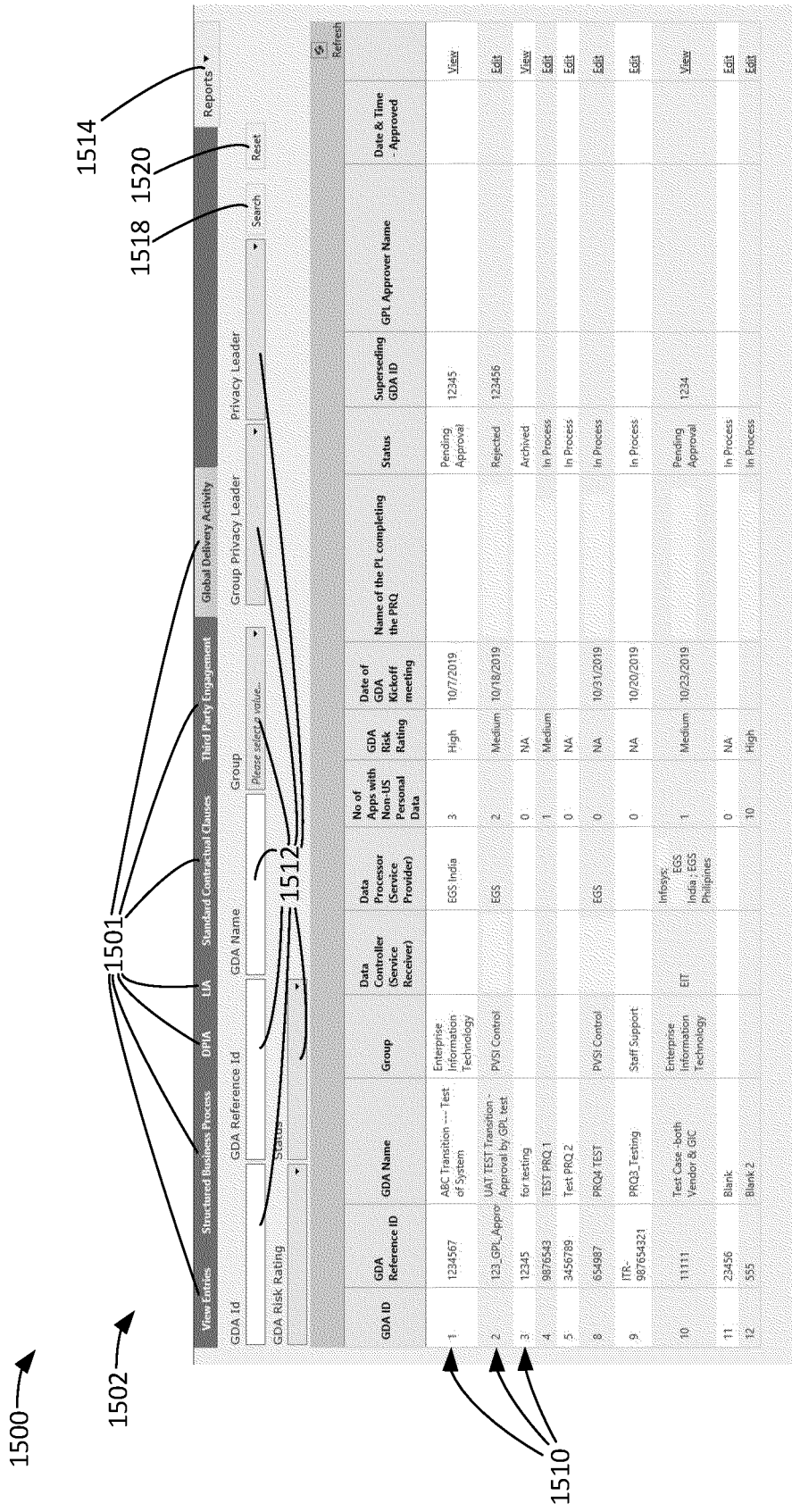
FIG. 15 is a system of record dashboard provided by the data management application shown on the user interface, according to an example embodiment.

Referring now to FIG. 15, in some embodiments, the data management application 120 is configured to provide a system of record (SOR) dashboard 1500. The SOR dashboard 1500 may be substantially similar to the SOR dashboard 300 described above, with reference to FIGS. 3, 8, 9, and 12. For example, the SOR dashboard 1500 may similarly include various data management page tabs 1501 configured to allow a user to selectively navigate between pages associated with the SOR dashboard 1500. As illustrated, the data management page tabs 1501 may provide access to selectable pages including a view entries page (similar to the view entries page 302 shown in FIG. 3), a structured business process page (similar to the structured business process page 304 shown in FIG. 8), a DPIA page (similar to the DPIA page 306 shown in FIG. 9), and an LIA page (similar to the LIA page 308 shown in FIG. 12). Furthermore, the data management page tabs 1501 may provide access to selectable pages including a standard contractual clauses page, a third part engagement page, and a global deliver activity (GDA) page 1502 (shown in FIG. 15). Each of the various pages associated with the SOR dashboard 1500 may include various GDA information fields 1510 having pertinent information preloaded or enterable therein.

For example, the standard contractual clauses page may include various information pertaining to standard contracts (e.g., data privacy contracts) in place for various applications. The third party engagement page may include various information pertaining to third party vendors utilized by various applications throughout the enterprise, as well as any agreements or other engagements in place with those third party vendors.

The GDA page 1502 may provide insight into how non-U.S. personal data is further processed and/or offshored throughout the enterprise. The GDA page 1502 include various data management search fields 1512, GDA information fields 1510, and a reports dropdown box 1514. The various data management search fields 1512 may allow a user of the data management application 120 to input (e.g., via the input/output circuit 113) a set of criteria to find a particular GDA or group of GDAs to view and/or generate reports on. For example, the data management search fields 1512 may include fields for various GDA identification numbers, GDA names, GDA risk ratings, GDA statuses, and so on for a user of the data management application 120 to find their desired GDA or group of GDAs. Once the user has entered the desired search criteria into the various data management search fields 1512, the user may click on a search button 1516 to enter the search criteria. The user may also click on a reset button 1518 to erase the entered search criteria from the data management search fields 1512.

Once the search criteria has been entered by the user, the GDA information may then be populated into the various GDA information fields 1510. The various GDA information fields 1510 may be sorted into rows of information pertaining to individual GDAs. The GDA information displayed in each row may similarly include the various GDA identification numbers, GDA names, GDA risk scores, GDA statuses, and so on. In some instances, the GDA information may further include a number of applications having non-U.S. personal data that is associated with a particular GDA. It should be appreciated that various additional information may be displayed in the GDA information fields 1510, as desired for a particular situation or GDA.

Similarly, once the search criteria has been entered by the user and the various GDA information fields 1510 have been populated, the user may select to produce various reports by clicking on the reports dropdown box 1514 and selecting a desired report from a list of potential reports.

Figure 16:
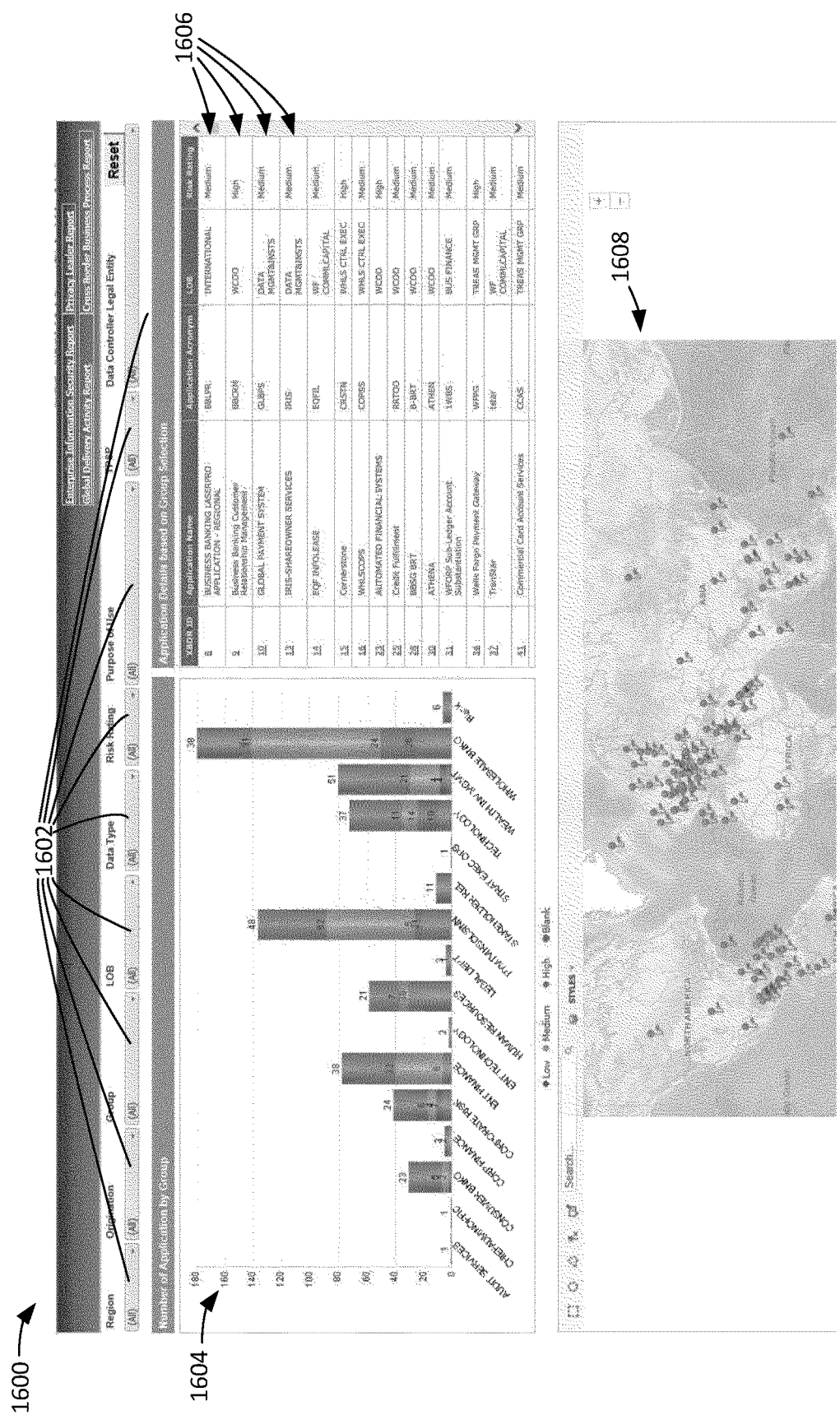
FIG. 16 is a data flow dashboard provided by the data management application shown on the user interface, according to an example embodiment.

Referring now to FIG. 16, in some embodiments, the data management application 120 is configured to provide a data flow dashboard 1600. The data flow dashboard 1600 may be substantially similar to the data flow dashboard 1300, described above. For example, the data flow dashboard 1600 may include various application sortation drop boxes 1602, an application information chart 1604, various application information fields 1606, and an application mapping field 1608. The various application sortation drop boxes 1602, the application information chart 1604, the various application information fields 1606, and the application mapping field 1608 may each be substantially similar to the various application sortation drop boxes 1302, the application information chart 1304, the various application information field 1306, and the application mapping field 1308 described above, with reference to FIG. 13.

Further, the data flow dashboard 1600 includes various report links 1614 that may be configured to allow the user to view various reports pertaining to the application set obtained by the user via the application sortation dropdown boxes 1602. For example, the various report links 1614 may allow the user to selectively view an enterprise information security report, a privacy leader report, a cross border business process report, and/or a global delivery activity report.

Figure 17:
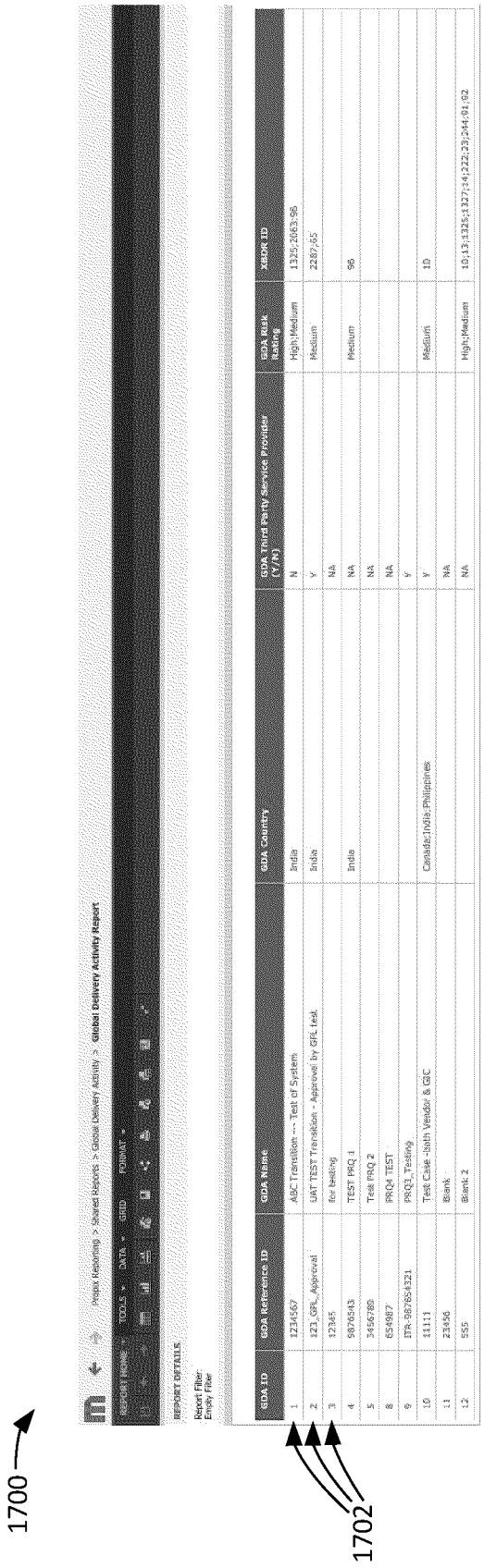
FIG. 17 is a global delivery activity report provided by the data management application shown on the user interface, according to an example embodiment.

Referring now to FIG. 17, the data management application 120 may be configured to selectively generate a global delivery activity (GDA) report 1700 (e.g., by clicking on the corresponding report link 1614 of the data flow dashboard 1600). The GDA report 1700 may include a variety of information pertaining to various GDAs associated with the application set obtained by the user via the application sortation dropdown boxes 1602 of the data flow dashboard 1600. Specifically, the GDA report 1700 may include various global data activity (GDA) information fields 1702.

The various GDA information fields 1702 may be substantially similar to the GDA information fields 1510 described above, with reference to the SOR dashboard 1500 and the GDA page 1502. Accordingly, the GDA information fields 1702 may include various information pertaining to the selected set of GDAs. This information may include any of the same GDA information discussed above, with reference to the GDA information fields 1510 of the SOR dashboard 1500 and the GDA page 1502.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more dedicated processors communicatively coupled to one or more dedicated memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Additionally or alternatively, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc.

An example system for implementing the overall system or portions of the embodiments might include general-purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method for managing customer information pertaining to at least one application associated with a provider, the method comprising:
    obtaining initial application information pertaining to the at least one application, the initial application information including a location of processing of the customer information by the at least one application, the location of processing including a location of origin for the customer information within the at least one application and a location of termination for the customer information within the at least one application;
    determining that additional application information is required based on the location of processing;
    upon determining that the additional application information is required, obtaining the additional application information based at least in part on the location of processing;
    determining a risk level associated with the at least one application based on the initial application information and the additional application information;
    generating a navigable application dashboard including an application mapping field providing a visual graphic depiction of the location of origin of the at least one application and the location of termination of the at least one application; and
    displaying, via a graphical user interface, the navigable application dashboard to a user.

2. The method of claim 1, wherein at least one of the initial application information and the additional application information includes data flow information.

3. The method of claim 2, wherein the data flow information includes at least one of data type information and data usage information.

4. The method of claim 1, wherein the customer information includes at least one of personal information and sensitive information.

5. The method of claim 1, wherein, upon determining that the risk level associated with the at least one application is a high risk level, the method further comprises performing at least one corrective action to reduce risk associated with the at least one application.

6. The method of claim 5, wherein the at least one corrective action includes at least one of performing a data protection impact analysis, performing a legitimate interest analysis, performing a data access review, performing a risk acceptance review, performing a third-party vendor usage review, and pseudonymizing the customer information within the at least one application.

7. The method of claim 1, wherein the method further comprises:
    generating an application report; and
    providing the application report to the user.

8. The method of claim 7, wherein the application report includes a data flow mapping field providing a visual representation of the location of origin, the location of termination, and how the customer information is transferred between the location of origin and the location of termination.

9. A method for managing customer information pertaining to at least one application associated with a provider, the method comprising:
   obtaining initial application information pertaining to the at least one application, the initial application information including a location of origin of the customer information within the at least one application and a location of termination of the customer information within the at least one application;
   determining that additional application information is required based on the location of origin and the location of termination;
   upon determining that the additional application information is required, obtaining the additional application information based at least in part on the location of origin and the location of termination;
   determining a risk level associated with the at least one application based on the initial application information and the additional application information;
   generating an application report including a data flow mapping field providing a visual representation of the location of origin, the location of termination, and how customer information is transferred between the location of origin and the location of termination; and
   providing the application report to a user.

10. The method of claim 9, wherein at least one of the initial application information and the additional application information includes data flow information including at least one of data type information and data usage information.

11. The method of claim 9, wherein the customer information includes at least one of personal information and sensitive information.

12. The method of claim 9, wherein, upon determining that the risk level associated with the at least one application is a high risk level, the method further comprises performing at least one corrective action to reduce risk associated with the at least one application.

13. The method of claim 12, wherein the at least one corrective action includes at least one of performing a data protection impact analysis, performing a legitimate interest analysis, performing a data access review, performing a risk acceptance review, performing a third-party vendor usage review, and pseudonymizing the customer information processed within the at least one application.

14. A data management system comprising:
   a network;
   at least one provider computing system associated with at least one application configured to process customer information, the at least one provider computing system including a provider network interface structured to facilitate data communication via the network;
   a data management computing system comprising:
      a data management network interface structured to facilitate data communication via the network;
      a graphical user interface; and
      a processing circuit comprising a processor and a memory, the processing circuit structured to:
         obtain initial application information pertaining to the at least one application associated with the at least one provider computing system, the initial application information including a location of origin of the customer information within the at least one application and a location of termination of the customer information within the at least one application;
         determine that additional application information is required based on the location of origin and the location of termination;
         upon determining that the additional application information is required, obtain the additional application information based at least in part on the location of origin and the location of termination;
         determine a risk level associated with the at least one application based on the initial application information and the additional application information;
         generate an application report including a data flow mapping field providing a visual representation of the location of origin, the location of termination, and how the customer information is transferred between the location of origin and the location of termination; and
         provide the application report to a user of the data management computing system via the graphical user interface.

15. The data management system of claim 14, wherein the customer information includes at least one of personal information and sensitive information.

16. The data management system of claim 14, wherein, upon determining that the risk level associated with the at least one application is a high risk level, the processing circuit is further structured to perform at least one corrective action to reduce risk associated with the at least one application.

17. The data management system of claim 16, wherein the at least one corrective action includes at least one of performing a data protection impact analysis, performing a legitimate interest analysis, performing a data access review, performing a risk acceptance review, performing a third-party vendor usage review, and pseudonymizing the customer information processed within the at least one application.

* * * * *

UNITED STATES PATENT AND TRADEMARK OFFICE
CERTIFICATE OF CORRECTION

| | | |
|---|---|---|
| PATENT NO. | : 11,514,187 B1 | Page 1 of 1 |
| APPLICATION NO. | : 16/696710 | |
| DATED | : November 29, 2022 | |
| INVENTOR(S) | : Gregory Donald DiGregorio | |

It is certified that error appears in the above-identified patent and that said Letters Patent is hereby corrected as shown below:

On the Title Page

Item (12), should read: DiGregorio

Item (72), Inventor should read: Gregory Donald DiGregorio, Broomfield, CO (US);

Signed and Sealed this
Twenty-fifth Day of March, 2025

Coke Morgan Stewart
*Acting Director of the United States Patent and Trademark Office*